(12) United States Patent
Mori et al.

(10) Patent No.: US 6,704,018 B1
(45) Date of Patent: Mar. 9, 2004

(54) GRAPHIC COMPUTING APPARATUS

(75) Inventors: Kenichi Mori, Fujisawa (JP); Miwako Doi, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 328 days.

(21) Appl. No.: 09/689,794

(22) Filed: Oct. 13, 2000

(30) Foreign Application Priority Data

Oct. 15, 1999 (JP) .............................................. 11-294253

(51) Int. Cl.[7] .............................................. G06F 15/16
(52) U.S. Cl. ...................... 345/502; 345/423; 345/441; 345/552
(58) Field of Search .................. 345/502, 423, 345/441, 726, 557, 552, 418

(56) References Cited

U.S. PATENT DOCUMENTS

| | | |
|---|---|---|
| 4,590,465 A | 5/1986 | Fuchs |
| 4,783,649 A | 11/1988 | Fuchs et al. |
| 5,307,450 A * | 4/1994 | Grossman |
| 5,459,829 A | 10/1995 | Doi et al. |
| 5,689,627 A * | 11/1997 | Arai et al. |
| 5,886,703 A * | 3/1999 | Mauldin |

OTHER PUBLICATIONS

Steven Molnar et al. "PixelFlow: High–Speed Rendering Using Image Composition"; ACM Computer Graphics, vol. 26, No. 2, pp. 231–240, Jul. 26, 1992.

Robert Cook et al. "The Reyes Image Rendering Architecture" ACM Computer Graphics, vol. 21, No. 4, pp. 95–102, Jul. 27, 1987.

* cited by examiner

*Primary Examiner*—Matthew C. Bella
*Assistant Examiner*—Hau Nguyen
(74) *Attorney, Agent, or Firm*—Oblon, Spivak, McClelland, Maier & Neustadt, P.C.

(57) ABSTRACT

A graphic computing apparatus has a shape divider which generates a subpolygon mesh by dividing the unit shape of the surface of an object present in a three-dimensional space into a plurality of subpolygons arranged two-dimensionally and having an arbitrary size, a vertex processor which computes parameters required for drawing in units of pixels with respect to subpolygons for each vertex of the subpolygon mesh generated by the shape divider, a rendering processor for computing drawing data in units of pixels on the basis of the parameters computed by the vertex processor and picture data for texture mapping, and a frame memory which stores the drawing data as picture data, and at least data for texture mapping required for the rendering processor to compute the drawing data.

25 Claims, 19 Drawing Sheets

POLYGON MESH INCLUDING 4×4
SUBPOLYGONS FOUR FULL CIRCLES
INDICATE REPRESENTATIVE
VERTICES OF SUBPOLYGONS

TRIANGLE STRIP DEFINED
BY EIGHT TRIANGLES
AND 10 VERTICES

GRAPHIC COMPUTING APPARATUS

CROSS-REFERENCE TO RELATED APPLICATIONS

This application is based upon and claims the benefit of priority from the prior Japanese Patent Application No. 11-294253, filed Oct. 15, 1999, the entire contents of which are incorporated herein by reference.

BACKGROUND OF THE INVENTION

The present invention relates to a graphic computing apparatus for drawing high-quality three-dimensional computer graphics (CG) in real time.

A system such as a game machine using real-time three-dimensional (3D) CG is required to execute a graphic process that receives and draws data called a primitive, which represents a unit shape of the surface of an object present in a 3D space, i.e., a 3D object (to be simply referred to an object hereinafter). In order to execute this process at high speed, a graphic computing apparatus implemented as hardware is used.

In a conventional graphic computing apparatus, a plane polyhedron called a polygon is used as a primitive of an object, and undergoes drawing to express a 3D space. More specifically, the conventional graphic computing apparatus is roughly comprised of three elements, i.e., a "geometry processor", "rasterization processor", and "frame memory", and processes are done in a pipeline manner.

The geometry processor executes coordinate conversion and a lighting process of a polygon as a primitive in units of vertexes. The geometry processor also computes texture coordinates corresponding to vertexes as needed, but does not read any texture image itself from the frame memory. The geometry processor obtains screen coordinate values, colors, and texture coordinate values of the vertexes of a polygon as processing results and passes them to the rasterization processor.

The rasterization processor executes a process for drawing a polygon on the frame memory in units of pixels. The color of each pixel is determined by linear interpolation of colors assigned to individual vertexes using a method called smooth shading. The rasterization processor uses a scheme for hiding (not drawing) an object which is hidden or occluded by another object by a hidden-surface removal algorithm called Z-buffering using a Z buffer assured on the frame memory, upon drawing. Furthermore, the rasterization processor uses a technique called texture mapping for mapping a two-dimensional (2D) picture using a texture image stored in the frame memory upon executing a drawing process in units of pixels.

In the texture mapping process, the positions of corresponding texture image elements in a texture image region on the frame memory are obtained in units of pixels on the basis of the texture coordinate values from the geometry processor, and color data at those positions are read from the texture image region, and undergo an arithmetic process with colors in units of pixels determined by linear interpolation mentioned above, thus determining colors to be written in the frame memory. Conventionally, arithmetic sections in units of pixels in the texture mapping process are built in the rasterization processor as a hardware circuit, and can only execute a very simple arithmetic process.

In actual system arrangements, for example, the process of the geometry processor is implemented by a program of a CPU, the geometry processor is included in the CPU, the geometry processor and rasterization processor are formed by a single LSI, or the rasterization processor and frame memory are formed by a single LSI. In any of these arrangements, however, the process from the geometry processor to the rasterization processor is basically done by a one-way pipeline process.

On the other hand, as a still advanced 3D CG technique, a parallel type graphics architecture based on a pixel computing scheme is known. As an example of this architecture, Pixel Flow/Pixel Plane disclosed in Molnar, S. et al., "Pixel Flow: High-Speed Rendering Using Image Composition", Computer Graphics (Proc. of SIGGRAPH '92), Vol. 26, No. 2, pp. 231–240 (reference 1), U.S. Pat. No. 4,590,465 (reference 2), U.S. Pat. No. 4,783,649 (reference 3), and the like is known.

This Pixel Flow/Pixel Plane is characterized in that SIMD processors assigned in units of pixels execute exchangeable programs upon rasterizing a polygon to determine colors by complicated procedural arithmetic operations in units of pixels and to write them in the frame memory, thus achieving elaborate picture expression. However, since processes must be done in units of pixels, arithmetic operations using many SIMD processors are required to draw a large polygon which has only simple surface properties, and a large number of SIMD processors are required to implement such process at high speed, resulting in a bulky system. Also, this technique can hardly implement displacement mapping in which the surface position of an object is displaced.

Real-time 3D CG such as a game or the like is required to display pictures with the highest possible quality within a limited time called a frame time represented by 1/60 sec so as to display animation that moves smoothly.

The balance between high speed and high quality of image generation is the most important point for application software creators of, e.g., games and the like, and a graphic computing apparatus for real-time 3D CG is required to have an arrangement with which the application creators can freely control the speed and image quality.

However, in the conventional graphic computing apparatus, since a flexible vertex process as a procedural process in the geometry processor and a texture process in the rasterization processor using the frame memory are independently shared and expressions that can be achieved by the respective portions are fixed, the control method of the speed and image quality is limited.

As a technique required to provide higher-quality pictures than conventional ones in real-time 3D CG, techniques currently used to generate very high-quality pictures in the fields of "non-real-time 3D CG" such as movies and the like are known. These techniques include:

(1) a scheme for displaying objects such as persons, living bodies, and the like with high reality by modeling based on curved surface definition;

(2) displacement mapping for displacing the surface shape of each object;

(3) a scheme for drawing by computing shadows to make the layout of objects in a space easy to understand;

(4) image-based rendering for generating 3D CG by arithmetic operations from actually sensed images; and (5) a non-photo-realistic rendering scheme for generating a sketch-style picture, illustration-style picture, and the like by procedural shading.

In the field of "non-real-time CG", the time upon displaying pictures on a screen is determined, but the image generation processing time is not limited when pictures to be displayed are obtained one by one by computations. Hence, in order to implement these schemes in real-time 3D CG, a mechanism for executing graphic processes at higher speed is required.

However, in the structure of the conventional graphic computing apparatus, since the vertex process in a geometry section and the texture process in a rendering section are separated and shared by the geometry and rendering units, and possible expressions in the individual processors are fixed, elaborate, real pictures cannot be efficiently drawn using the aforementioned schemes.

As an example to which the aforementioned schemes in the "non-real-time CG" field can be applied, a REYES architecture proposed by Robert L. Cook et al., "The Reyes Image Rendering Architecture", Computer Graphics (Proc. of SIGGRAPH '87), Vol. 21, No. 4, pp. 95–102 (reference 4) is known. This architecture is implemented by software, and is commercially available as "PHOTOREALISTIC RENDERMAN" software from Pixar Animation Studios, USA. This architecture divides an input primitive into polygons called micropolygons equal to or smaller than the-pixel size, and programmably executes elaborate processes including displacement mapping in units of vertexes of micropolygons.

However, this REYES architecture attaches importance on creation of very high-quality pictures. Hence, this architecture requires a long time for arithmetic operations since it is not devised to shorten the drawing time, which is strictly required in real-time 3D CG, and is not suitable for real-time hardware. Especially, since all primitives are basically processed by dividing them into small micropolygons equal to or smaller than the pixel size, a huge number of micropolygons are generated (for example, in the example described in reference 4, the number of micropolygons is 6.8 millions, resulting in poor adaptability to real-time hardware.

BRIEF SUMMARY OF THE INVENTION

It is an object of the present invention to provide a graphic computing apparatus which allows an application creator to freely control the speed and image quality and can implement a high-quality image generation scheme used in non-real-time CG in real time.

The present invention provides a graphic computing apparatus comprising a shape divider which divide a unit shape of a surface of an object present in a three-dimensional space into a plurality of subpolygons arranged two-dimensionally and having an arbitrary size, to generate a subpolygon mesh, a vertex processor which computes parameters required for drawing in units of pixels with respect to subpolygons for each vertex of the subpolygon mesh generated by the shape divider, a rendering processor which computes drawing data in units of pixels on the basis of the parameters computed by the vertex processor and picture data for texture mapping, and a frame memory which stores the drawing data as picture data together with at least data for texture mapping required for the rendering processor to compute the drawing data.

More specifically, each subpolygon mesh generated by the shape divider has a 2D structure of subpolygons, and the vertex processor computes lighting and the like in units of 3D vertexes of respective subpolygons. Upon dividing in the shape divider, since the size of each subpolygon obtained by breaking up a primitive can be designated by various methods, the number of subpolygons is controlled to control the computation time and picture quality.

Since the vertex processor can programmably process in units of vertexes of subpolygons, processes finer than the vertex unit of a primitive can be done. More specifically, drawing can be done for a primitive to which displacement mapping is applied.

The apparatus further comprise a frame memory readout route which reads out data at least for texture mapping held by the frame memory and transfers the readout data to the vertex processor. The vertex processor reads data at least for texture mapping corresponding to the vertexes of polygon meshes via the frame memory readout route, and computes parameters required for drawing in units of pixels of subpolygons in units of vertexes of polygon meshes using the read data.

By adding the frame memory readout route from the image memory to the vertex processor, arithmetic operations in units of vertexes can use texture data and picture data such as depth map data, allows coarse, high-speed texture mapping and shading for coarsely divided subpolygon meshes, and allows high-quality texture mapping and shading equal to or smaller than a pixel unit for subpolygon meshes with a size smaller than a pixel. A cache may be added to this frame memory data readout route, thus reducing the number of times of access to the frame memory and further improving the processing speed.

The vertex processor has a plurality of processing elements which respectively make arithmetic operations for computing parameters required for drawing in units of pixels of subpolygons in units of vertexes of polygon meshes, and simultaneously make arithmetic operations for a plurality of vertexes in accordance with an identical program.

Furthermore, these plurality of processing elements repeat a process for simultaneously making arithmetic operations for each row of a subpolygon mesh in correspondence with the number of rows of the subpolygon mesh. That is, upon executing the vertex process for a subpolygon mesh as a 2D structure in the vertex processor, the plurality of processing elements which are arranged linearly are assigned each row of a subpolygon mesh, and make arithmetic operations in units of rows, thus improving the use efficiency of the processing elements, and improving the total processing speed.

The plurality of processing elements linearly line up, and neighboring processing elements in the lineup direction are connected via data transfer routes, and all the processing elements simultaneously transfer at least some of internal data to neighboring processing elements in the arrangement direction. In this manner, when the vertex processor uses arithmetic operation results for neighboring vertexes, a normal vector or the like can be easily computed.

Furthermore, by providing a triangle strip construction section which constructs arithmetic operation results in units of vertexes by the plurality of processing elements into a successive triangle strip, and transfers it to the rendering processor that executes frame painting, the processing efficiency can be improved.

According to the graphic computing apparatus of the present invention, various high-quality drawing processes which are hard for the conventional graphic computing apparatus to implement can be flexibly done, high-speed drawing as in the conventional graphic computing apparatus can be achieved, and their tradeoff can be easily controlled.

Another graphic computing apparatus according to the present invention has a plurality of vertex processors and an exchanger which arbitrarily exchanges and connects the output of the shape divider and the inputs of the plurality of vertex processors. In this way, parallel processes of a plurality of subpolygon meshes can be done to improve the processing efficiency, and the total processing time can be shortened.

Still another graphic computing apparatus according to the present invention has a plurality of shape dividers, a plurality of vertex processors, and an input distributor which distributes primitive data to the plurality of shape dividers. With this arrangement, since parallel processes which divide a plurality of primitives into subpolygon meshes can be done, the processing efficiency can be improved, and the total processing time can be shortened.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described hereinafter with reference to the accompanying drawings.

Figure 1:
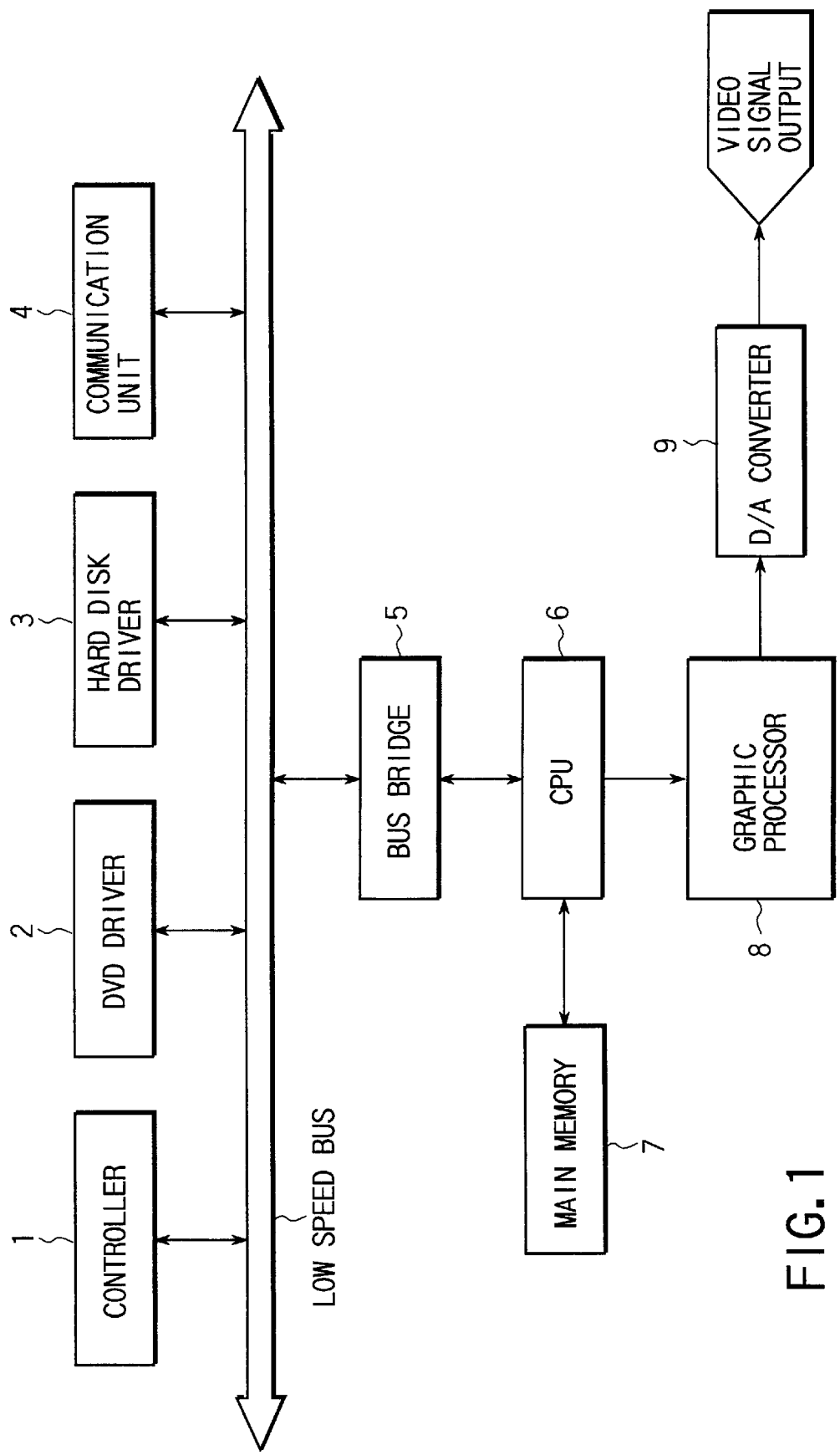
FIG. 1 is a block diagram showing the arrangement of a real-time 3D computer graphics system to which a graphic computing apparatus or graphic processor according to the present invention is applied.

A graphic processor according to the present invention is used in a real-time 3D graphics system such as a game machine or the like, as shown in, e.g., FIG. 1. A controller 1, DVD drive 2, hard disk drive 3, and communication unit 4 are connected to a low speed bus, and a CPU 6 is also connected thereto via a bus bridge 5. A medium (DVD) set in the DVD drive 2 stores application software such as a game or the like.

This application software is executed by the CPU 6 using a main memory 7, and 3D space data is updated when various processes are done in accordance with user's operations input from the controller 1. In this manner, the CPU 6 sends primitive data to a graphic processor 8 to execute a drawing process.

Picture data as a draw result output from the graphic processor 8 is converted into a video signal output via, e.g., a D/A converter 9, and the video signal is sent to and displayed on a display (not shown). The display may be either a dedicated display, or a display of a TV receiver, computer, or the like. A display screen on the display will be referred to as a screen hereinafter.

Embodiments of the graphic processor 8 according to the present invention will be explained below.

First Embodiment

Figure 2:
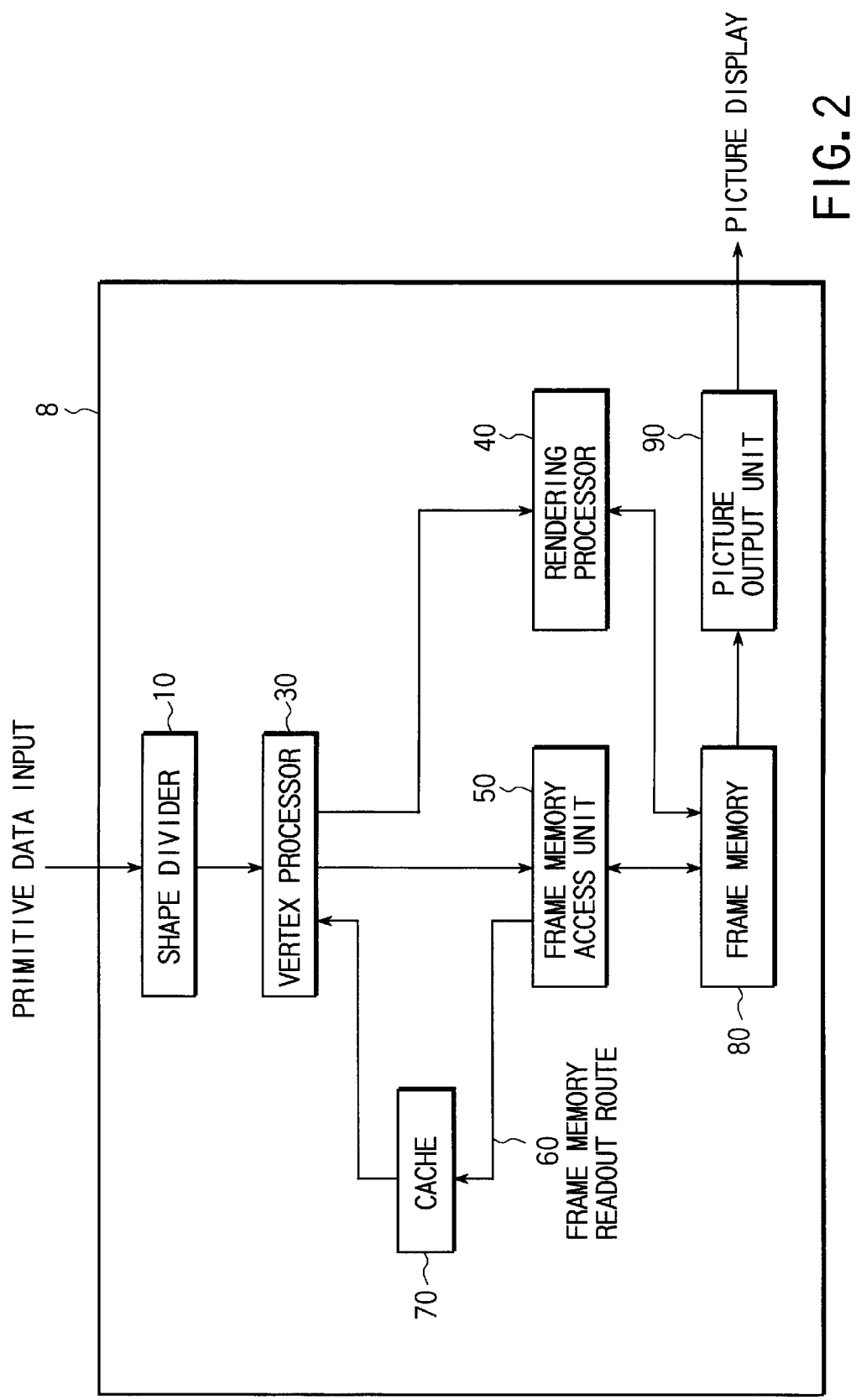
FIG. 2 is a block diagram showing the arrangement of a graphic processor according to an embodiment of the present invention.

FIG. 2 shows the arrangement of a graphic processor according to the first embodiment of the present invention. This graphic processor 8 comprises a shape divider 10, a vertex processor 30, a rendering processor 40, a frame memory access unit 50, a frame memory readout route 60, a cache 70 inserted in the frame memory readout route 60, a frame memory 80, and a picture output unit 90.

The graphic processor 8 receives data of a primitive from the CPU 6 shown in FIG. 1. The primitive is an element that forms a 3D space and 3D model, and primitive data expresses a unit shape of the surface of an object in a 3D space (to be referred to as an object hereinafter) using numerical value data. If an object is a normal object, a primitive is a polygon (plane polyhedron), and the surface shape of the object is expressed by a large number of polygons. However, the surface shape of a sphere, cube, cylinder, or the like is expressed by a single primitive. That is, conventional primitives are limited to several kinds including a polygon, but the present invention is not limited to them.

A primitive input to the graphic processor 8 is processed by the shape divider 10. The shape divider 10 divides the input primitive into a 2D matrix of a plurality of subpolygons, which can be processed by the vertex processor 30 in accordance with various programs, by an arbitrary method, so as to generate a mesh structure (to be referred to as subpolygon meshes hereinafter). In this case, the shape divider 30 can arbitrarily change the size of a subpolygon to be divided in accordance with a program. Details of the shape divider 10 will be described later.

The vertex processor 30 executes arithmetic processes for drawing in units of pixels of subpolygons for each vertex of subpolygon meshes generated by the shape divider 10 using various programs, and outputs parameters for each vertex required for drawing in units of pixels as arithmetic operation results in the form of, e.g., triangles, triangle strips, or the like and sends them to the rendering processor 40 and frame memory access unit 50.

A characteristic feature of the present invention is that the vertex processor 30 reads data from the frame memory 80 as needed via the frame memory access unit 50, the frame memory readout route 60 extending from the frame memory access unit 50 toward the vertex processor 30, and the cache 70 inserted in the route 60, and can use the read data in arithmetic processes of parameters required for drawing. Details of the vertex processor 30 will also be described later.

The rendering processor 40 corresponds to a rasterization processor in the conventional graphic computing apparatus mentioned above, and paints (renders) picture data stored in the frame memory 80 which is accessed by the frame memory access unit 50 using data in units of vertexes sent from the vertex processor 30. Rendering includes processes such as texture mapping, hidden-surface removal, lighting (illumination luminance computation), shading, antialiasing, perspective transformation, clipping, and the like, as is known in the 3D CG field.

The respective units of FIG. 2 will be described in more detail below.

Frame Memory 80

Figure 3:
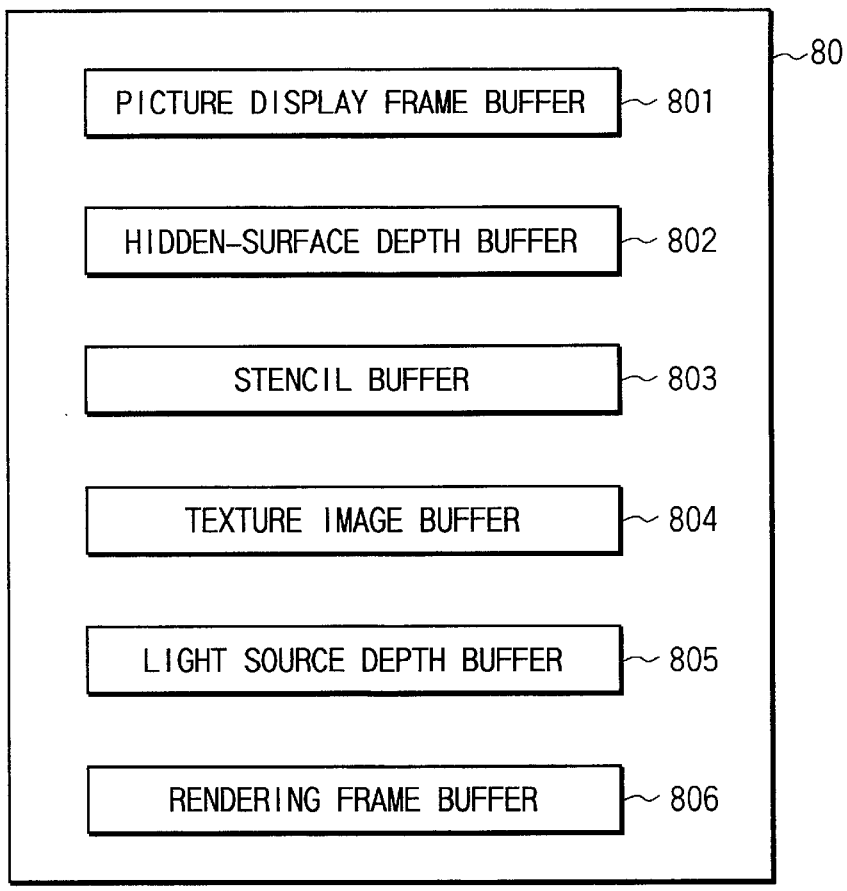
FIG. 3 is a block diagram showing the arrangement of a frame memory in the graphic processor.

The frame memory 80 stores picture data, and comprises a picture display frame buffer 801, hidden-surface removal depth buffer 802, stencil buffer 803, texture map memory 804, light source depth memory 805, and rendering frame buffer 806, as shown in FIG. 3. The respective components of the frame memory 80 have the following functions.

The picture display frame buffer 801 is a frame memory for storing 2D picture data displayed on the screen of the display. Picture elements of a 2D picture on the picture display frame buffer 801 are called pixels.

The hidden-surface removal depth buffer 802 holds 2D sequence of depth values for hidden-surface removal, and its contents are Z values or 1/Z values of X, Y, and Z coordinates.

The stencil buffer 803 has an expanded function of the depth buffer, and holds attribute information that an application can use in units of picture elements.

The texture map memory 804 holds data of a picture (texture image) used in texture mapping. The picture element of a texture image on this texture map memory 804 is called a texel.

The light source depth buffer 805 is drawn from a light source for shading.

The multi-path rendering frame buffer 806 is a frame memory serving as a working storage area, the contents of which are used in the next drawing process as a texture image or the like.

Data access to this frame memory 80 is made by the frame memory access unit 50. Picture data read out from the picture display frame buffer 801 in the frame memory 80 is sent to a display (not shown) via the picture output unit 90.

Shape Divider 10

Figure 4:
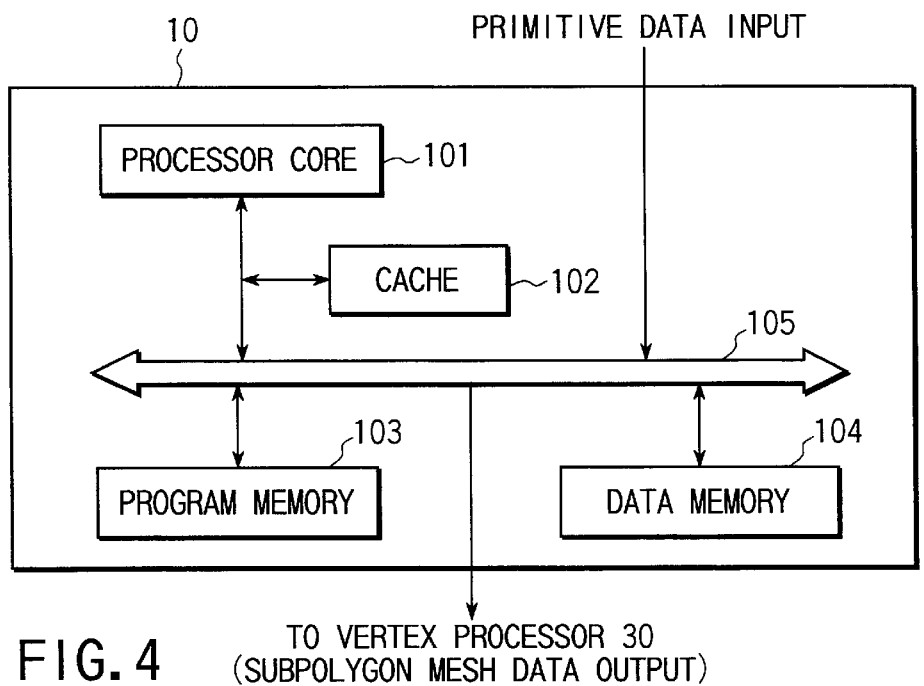
FIG. 4 is a block diagram showing the arrangement of a shape divider in the graphic processor.

FIG. 4 shows an example of the arrangement of the shape divider 10. The shape divider 10 has a processor core 201, and executes the aforementioned division process using a data memory 204 as a work area in accordance with a program stored in a program memory 203. In this embodiment, the divider 10 comprises a cache 202 to achieve high-speed access to the program memory 203 and data memory 204, but the cache 202 need not always be provided. In this embodiment, the program memory 203 and data memory 204 are included in the shape divider 10, but the present invention is not limited to such specific arrangement.

The shape divider 10 selects and executes a program of a division method suitable for each input primitive from the program memory 203, and divides the primitive into a 2D matrix of a plurality of subpolygons having an arbitrary size. Primitives to be input include, e.g., a polygon, NURBS curved surface, subdivision surface, line segment, and point group. With such division process, the shape divider 10 converts an input primitive into one or a plurality of subpolygon meshes, and sends the subpolygon meshes to the vertex processor 30.

Figure 5:
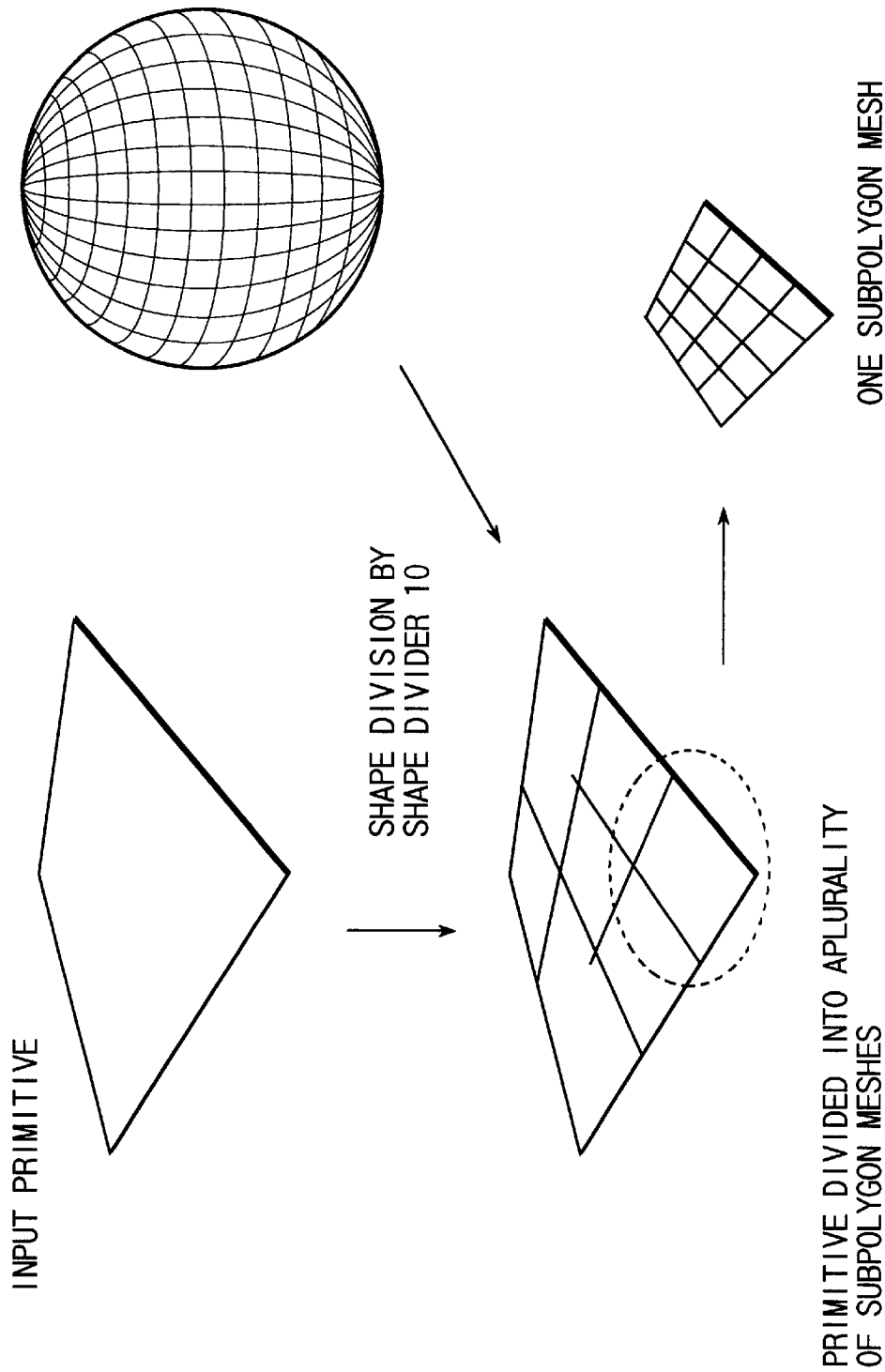
FIG. 5 is a view showing the process upon dividing a primitive of a rectangle into a plurality of subpolygon meshes by the shape divider.

FIG. 5 shows the process upon dividing a primitive of a sphere or rectangle into a plurality of subpolygon meshes by the shape divider 10. A subpolygon is a processing unit of the vertex processor 30. As shown in FIG. 5, a subpolygon mesh is made up of one or a plurality of subpolygons. Subpolygons that form one subpolygon mesh are two-dimensionally arranged in terms of their neighboring relationship, and have a data structure in which vertexes common to neighboring subpolygons are combined. In this manner, the efficiency can be improved compared to a case wherein vertex data of each subpolygon are independently held.

Figure 6A:
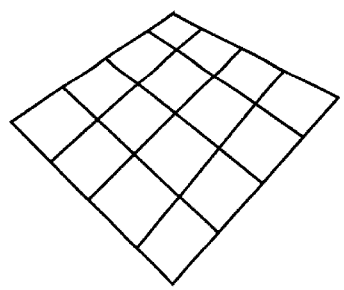
FIGS. 6A to 6D are views showing how a subpolygon mesh is projected onto a screen coordinate system, the relationship among neighboring subpolygons included in the subpolygon mesh, vertexes of the subpolygons, and the correspondence between the vertexes and subpolygons.

This point will be explained below using FIGS. 6A to 6D. FIG. 6A shows how a subpolygon mesh having 4 (vertical)×4 (horizontal) subpolygons, i.e., a total of 16 subpolygons is projected-onto the screen coordinate system (the coordinate system of the display screen of the display). This subpolygon mesh has 5 (vertical)×5 (horizontal) vertexes, i.e., a total of 25 vertexes.

Figure 6B:
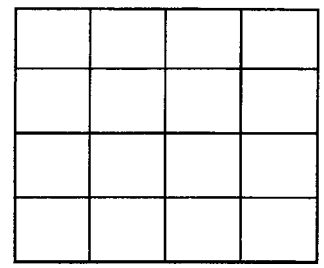

FIG. 6B shows the neighboring relationship among the 16 subpolygons included in the subpolygon mesh.

Figure 6C:
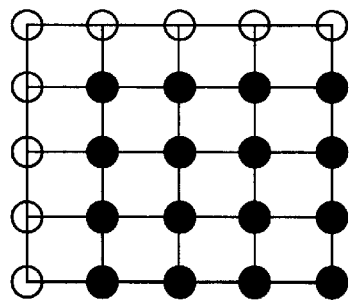
Figure 6D:
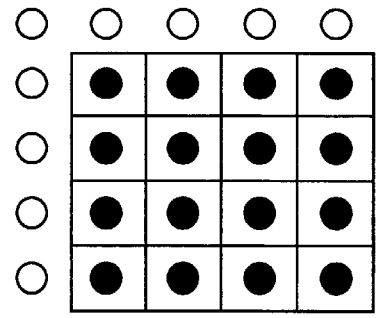

FIG. 6C shows the subpolygon mesh in which vertexes indicated by full circles of the 5 (vertical)×5 (horizontal) vertexes are representative vertexes of the 4 (vertical)×4 (horizontal) subpolygons. That is, a total of 25 vertexes indicated by full and open circles in FIG. 6C are those shared by 16 polygons, and are fewer than 64 data when 16 subpolygons independently have vertex data. The 16 full circles in FIG. 6C indicate vertexes, which represent the 16 subpolygons, of the 25 vertexes. FIG. 6D simply illustrates the correspondence between the vertexes indicated by full circles and subpolygons by shifting the circle positions.

In general, a subpolygon mesh that holds Pm (vertical)× Pn (horizontal) subpolygons has (Pm+1) (vertical)×(Pn+1) (horizontal) vertexes (to be referred to as Vm (vertical)×Vn (horizontal) vertexes hereinafter). For example, a minimum mesh structure of a subpolygon mesh is a mesh made up of only one subpolygon, which has four vertexes. The shape divider 10 divides a primitive so that the number of vertical or horizontal vertexes of each subpolygon mesh becomes equal to or smaller than that which can be processed by the vertex processor 30.

Figure 7:
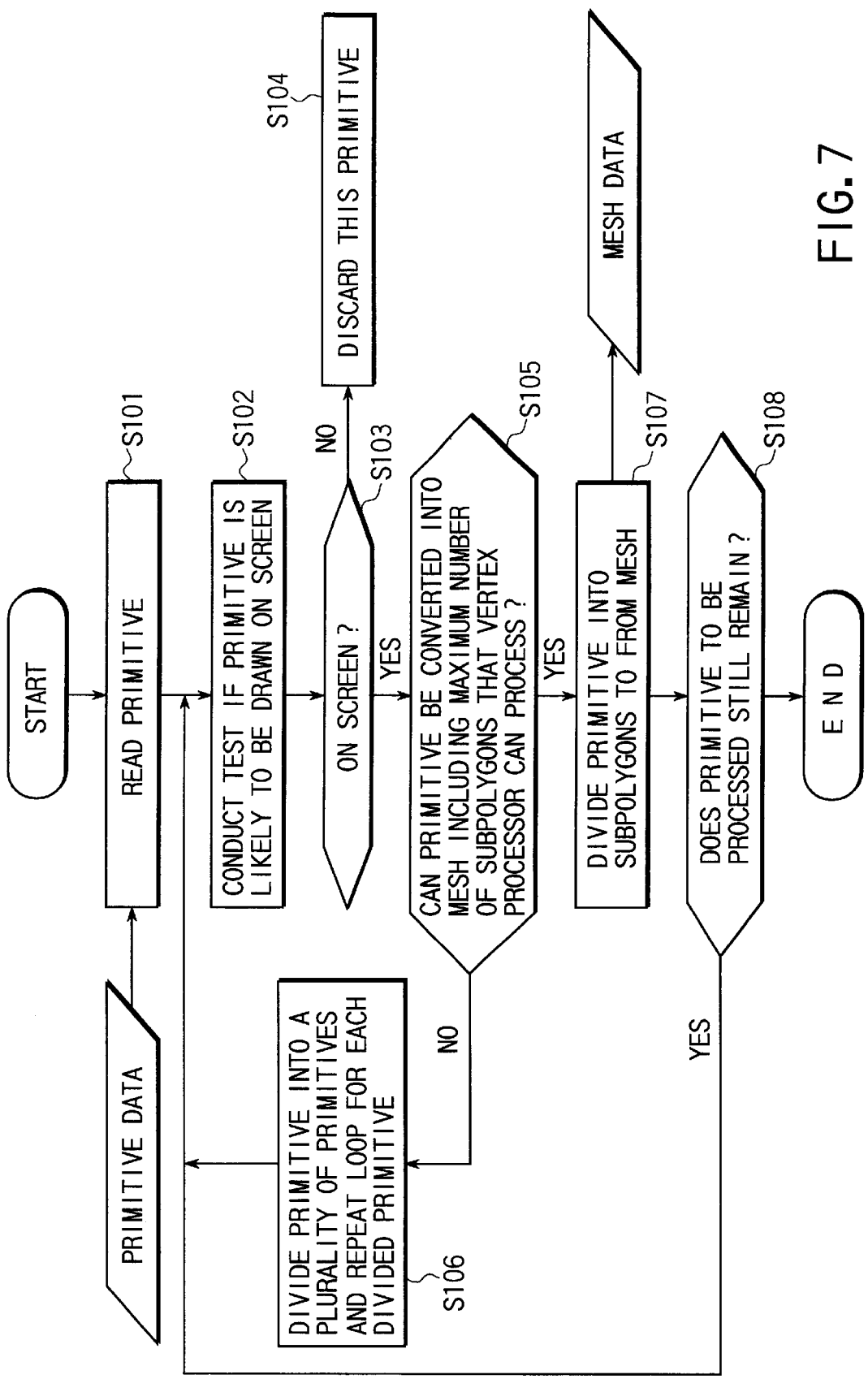
FIG. 7 is a flow chart showing the flow of a primitive dividing process in the shape divider.

The flow of the primitive division process in the shape divider 10 will be explained below using the flow chart shown in FIG. 7.

Primitive data is read (step S101). It is tested based on this primitive data if a primitive is likely to be drawn on the screen (step S102). This test can be implemented by computing a box or sphere which covers the primitive, and checking if the box or sphere is present inside the range of the screen (the display screen of the display) in the screen coordinate system.

If it is determined based on the test result in step S102 that the primitive is likely to be drawn on the screen (YES in step S103), it is checked if that primitive can be converted into subpolygon meshes each including a maximum number of subpolygons or less that the vertex processor 30 can process (step S105). The upper limit of the number of subpolygons that the vertex processor 30 can process depends on the apparatus arrangement. A subpolygon is normally a rectangle which has four 3D vertexes, and the vertex processor 30 determines color information of the subpolygon, as will be described later.

If the primitive can be converted into subpolygon meshes each including a maximum number of subpolygons or less that the vertex processor 30 can process, the primitive is divided into subpolygons, sets of which define subpolygon meshes (step S107). Coordinate conversion, i.e., a process for converting the coordinates of each vertex of each subpolygon mesh into the screen coordinate system is not done at that time, but is done later by the vertex processor 30.

If the primitive cannot be converted into subpolygon meshes each including a maximum number of subpolygons or less that the vertex processor 30 can process, the primitive is divided into a plurality of primitives, and the loop repeats itself for each divided primitive (step S106), i.e., the same process is done again for the divided primitive in step S101.

On the other hand, if the primitive is unlikely to be drawn on the screen (NO in step S103), the data of that primitive is discarded (step S104), and the flow jumps to step S108. The shape divider 10 can arbitrarily change the size of each subpolygon obtained by dividing the input primitive, as described above. Since the division methods in the shape divider 10 are stored as programs in the program memory 103, these programs allow various division methods as follows.

(1) A program for converting an input primitive into meshes in each of which each subpolygon size is larger than a set of a given number of pixels is used. In this way, since the number of subpolygons can be reduced, a high drawing speed can be assured.

(2) A program for converting an input primitive into subpolygon meshes in each of which each subpolygon size is smaller than a pixel is used. In this manner, since processes can be done for vertexes having a spacing smaller than a pixel, the primitive can be drawn by a high-quality scheme. For example, a primitive of curved surface definition can be displayed on the screen as a perfect curved surface.

(3) A program for converting an input primitive into subpolygon meshes in which subpolygons projected onto the screen coordinate system have one-to-one correspondence with pixels is used. This conversion is equivalent to processes in units of pixels done by the vertex processor 30.

When such conversion and the frame memory readout function of the vertex processor 30 from the frame memory 80 are used, various 2D picture process effects can be realized. On the other hand, some methods of designating the size of each subpolygon that defines each subpolygon mesh, i.e., the division size of the shape divider 10 are available.

(1) Division size information is appended to data of a primitive.

(2) Each program of the shape divider 10 dynamically determines the division size. More specifically, by changing the division size in correspondence with the remaining time of the predetermined frame time, drawing is adjusted to be complete within the frame time.

(3) Division is made until the subpolygon size on the screen becomes equal to or smaller than a designated pixel size. For example, while the number of subpolygons that define each subpolygon mesh converted from a primitive is equal to or smaller than the designated upper limit, division repeats itself.

A method that combines these methods (1) to (3) is also available.

Vertex Processor 30

The vertex processor 30 receives each subpolygon mesh from the shape divider 10, makes arithmetic operations of vertex displacement, coordinate conversion, coloring, and shading using various programs in units of vertexes of subpolygons which define the subpolygon mesh to obtain parameters required for the rendering processor 40 to draw on the frame memory 80, and sends the obtained data to the rendering processor 40. An outline of the process of the vertex processor 30 will be explained below.

The process of the vertex processor 30 for Pm (vertical)× Pn (horizontal) subpolygons included in a subpolygon mesh is done for (Pm+1) (vertical)×(Pn+1) (horizontal) vertexes. From this processing result, the colors of the vertexes of the Pm (vertical)×Pn (horizontal) subpolygons are determined. This correspondence has already been explained previously using FIGS. 6A to 6D.

Since the vertex processor 30 makes arithmetic operations in units of vertexes, displacement mapping which is hard for the conventional technique to implement can be easily implemented by computing a new coordinate value by adding a displacement obtained from a program or data to the input vertex coordinate value. Also, since a normal vector value can be computed by a method to be described later, and the displacement mapping result is reflected in lighting, a picture with higher reality can be generated. This processing example will be explained later using FIG. 9.

The vertex processor 30 can read picture data read out from the frame memory 80 by the frame memory access unit 50 via the frame memory readout route 60 and cache 70 upon arithmetic operations in units of vertexes. In this manner, data in units of vertexes on the frame memory 80, which cannot be used in the conventional technique, can be used. That is, by adding the frame memory readout route 60, a scheme that can only process in units of pixels can be programmably used in units of vertexes of subpolygons.

An example of use of data in units of vertexes on the frame memory 80 includes use of texture map data on the frame memory 80 in a vertex color determination process of each subpolygon. More specifically, since the shape divider 10 can divide a primitive so that the vertexes of each subpolygon mesh have arbitrary spacings on the screen, texture mapping and shading using a depth map can be done while controlling the balance between the processing time in the vertex processor 30 and the quality of a picture to be drawn.

For example, as for texture mapping, only a mapping scheme based on a simple mechanism of the rasterization processor is available in the conventional apparatus, but the vertex processor 30 can offer various schemes by program processes. Since the division size (subpolygon size) of the shape divider 10 is variable, a mesh obtained by coarse division allows coarse mapping with a smaller processing volume since a fewer number of vertexes are to be processed. Also, for a subpolygon mesh obtained by fine division to have a subpolygon size smaller than a pixel on the screen coordinate system, high-quality mapping equivalent to that based on texture mapping in units of pixels can be realized. In this manner, the processing time and picture quality can be freely controlled.

On the other hand, in shading using a depth map, the following control can be made. That is, a primitive is divided into a smaller subpolygon size for an object onto which a precise shadow is to be projected, and a large subpolygon size is used for an object onto which a rough shadow is to be projected at high speed. An example of the sequence of shading will be explained later using FIG. 10.

Since the rendering processor 40 that paints on the frame memory 80 has a function of reading texture image data from the frame memory 80 as in the conventional rasterization processor, more complicated mapping can be done. For example, texture mapping in units of pixels can be superposed on rough shading in units of vertexes of subpolygons. Also, a low-frequency portion of a texture pattern may be computed in units of subpolygons, and its high-frequency portion may be computed and drawn in units of pixels.

Since the hidden-surface removal depth buffer 802 with a hierarchical structure is assured in the frame memory 80, as shown in FIG. 3, a preliminary hidden-surface test can be conducted by comparing the computed depth values of vertexes and the values of the hidden-surface removal depth buffer 802 read out using the frame memory readout route 60 in an early stage of the process in units of vertexes in the vertex processor 30. This preliminary hidden-surface test inspects only if a subpolygon represented by a given vertex is not located in front of another object. If this test reveals that the subpolygon represented by the given vertex is not located in front of another object, a complicated, time-consuming process for determining the vertex color need not be done, and such wasteful process can be canceled, thus improving the efficiency.

On the other hand, when the shape divider 10 divides so that the vertexes of subpolygons match pixels, the following process can be done, i.e., the vertex processor 30 reads pixel data on the picture display frame buffer 801 in the frame memory 80 via the frame memory readout route 60 and cache 70 and returns the arithmetic operation results using the read data to pixels on the picture display frame buffer 801 in the frame memory 80. This processing example will be explained later with reference to FIG. 11. In this processing as well, the read pixel positions need not match write pixel positions.

In this manner, various 2D picture processing effects are available. For example, when pixel data of a plurality of regions on the picture display frame buffer 801 in the frame memory 80 are input to the vertex processor 30, the processing contents of the vertex processor 30 can be widely described by a program.

Output Data Format of Vertex Processor 30

Figure 8:
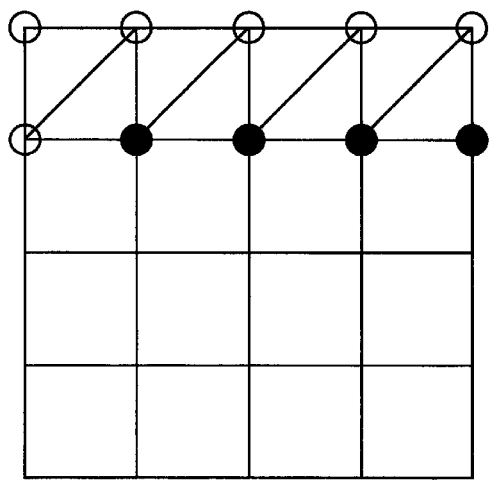
FIG. 8 is a view showing the relationship between a 4×4 subpolygon mesh and triangle strip.
Figure 8:
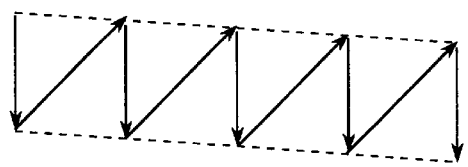

Some data formats are used upon outputting subpolygons of a subpolygon mesh processed by the vertex processor 30 to the rendering processor 40 and frame memory access unit 50. One of the output data format is the data configuration of a triangle strip which is also adopted in the conventional rasterizer scheme. The data configuration of a triangle strip omits data of vertexes shared by two neighboring triangles (vertexes at the two ends of one shared side) in a structure in which a plurality of triangles are laid out in succession so that each two neighboring triangles share one side, and matches the process in units of vertexes of the vertex processor 30. FIG. 8 shows an example of a triangle strip when a subpolygon mesh is made up of 4×4 subpolygons. First, a triangle strip which includes eight triangles and is defined by 10 vertexes is formed by four subpolygons in the first column. This triangle strip is obtained by processing at four vertexes indicated by full circles in FIG. 8. Note that the vertex at the left end of the second column does not represent a subpolygon. As other examples of the output data format of the vertex processor 30, a format for outputting one subpolygon as two independent triangles, and a format for outputting one subpolygon as a triangle strip which includes two consecutive triangles and has four vertexes are available. Suitable one of these output data formats is determined depending on the arrangement of the rendering processor 40 and frame memory access unit 50.

Since the vertex processor 30 is programmable, arbitrary processes can be done. Some processing examples will be explained below.

Processing Example 1 of Vertex Processor 30

Figure 9:
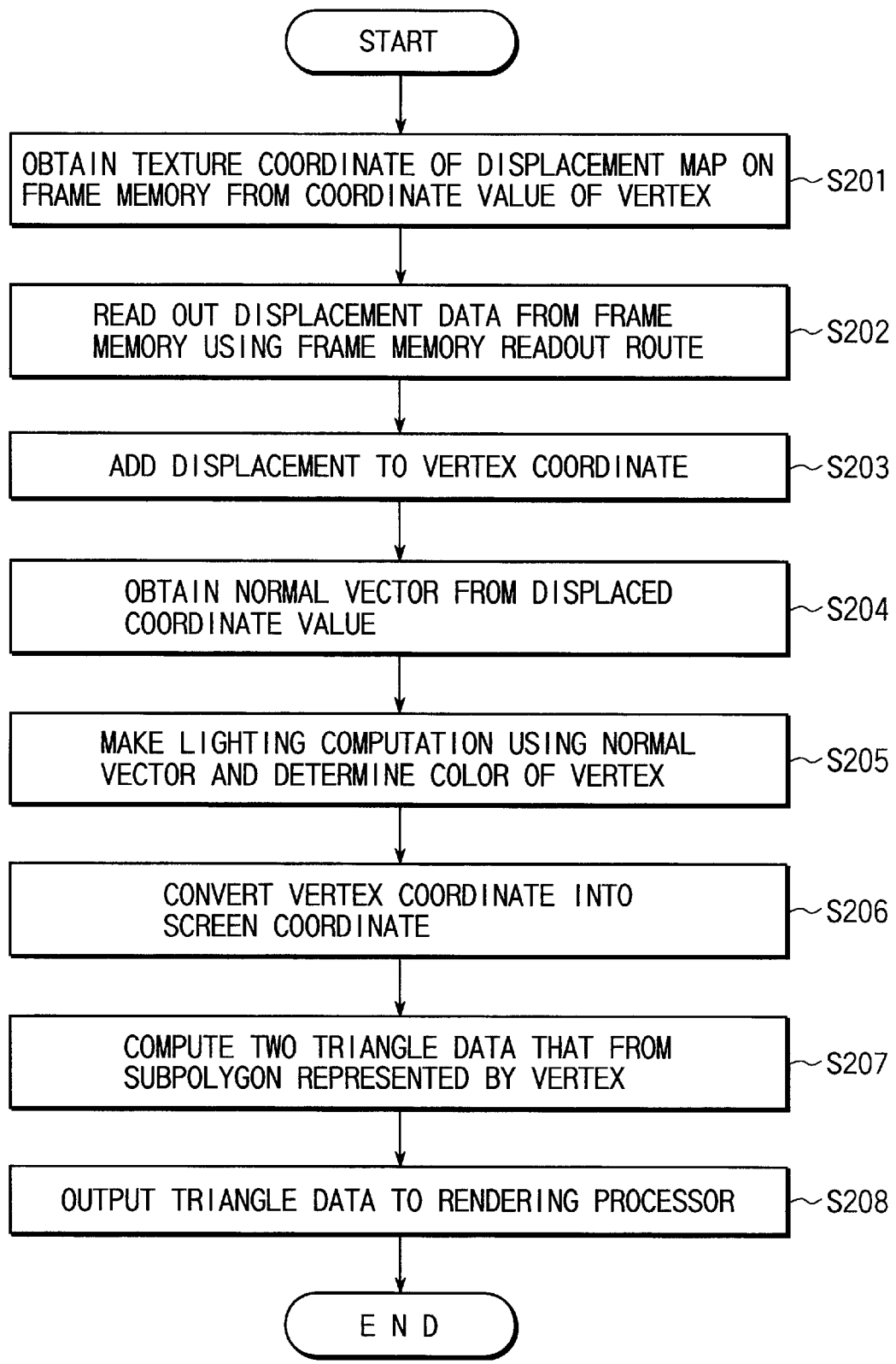
FIG. 9 is a flow chart showing an example of the flow of a process in units of vertexes in a vertex processor in the graphic processor.

The process in units of vertexes, which includes displacement mapping in the vertex processor 30 for polygon mesh data, will be explained below using the flow chart shown in FIG. 9.

A texture coordinate value of a displacement map on the texture map memory 803 in the frame memory 80 is obtained from the coordinate value of the vertex of interest (step S201). Displacement data is read from the frame memory 80 via the frame memory access unit 50 and frame memory readout route 60 (step S202). A displacement is added to the vertex coordinate based on the displacement data (step S203). A normal vector is obtained from the displaced coordinate value computed in step S203 (step S204). A method of obtaining a normal vector will be described in detail later using FIG. 16. A lighting computation (luminance computation) is made based on the normal vector obtained in step S204, and the color of the vertex of interest is computed based on the computation result (step S205). For drawing, the vertex coordinate is converted into a screen coordinate (step S206), and two triangle data that form a subpolygon represented by the vertex of interest are computed by obtaining coefficients of a trigonometric equation (step S207). The triangle data obtained in step S207 are output to the frame memory access unit 50 (step S208), thus ending the processing.

Processing Example 2 of Vertex Processor 30

Figure 10:
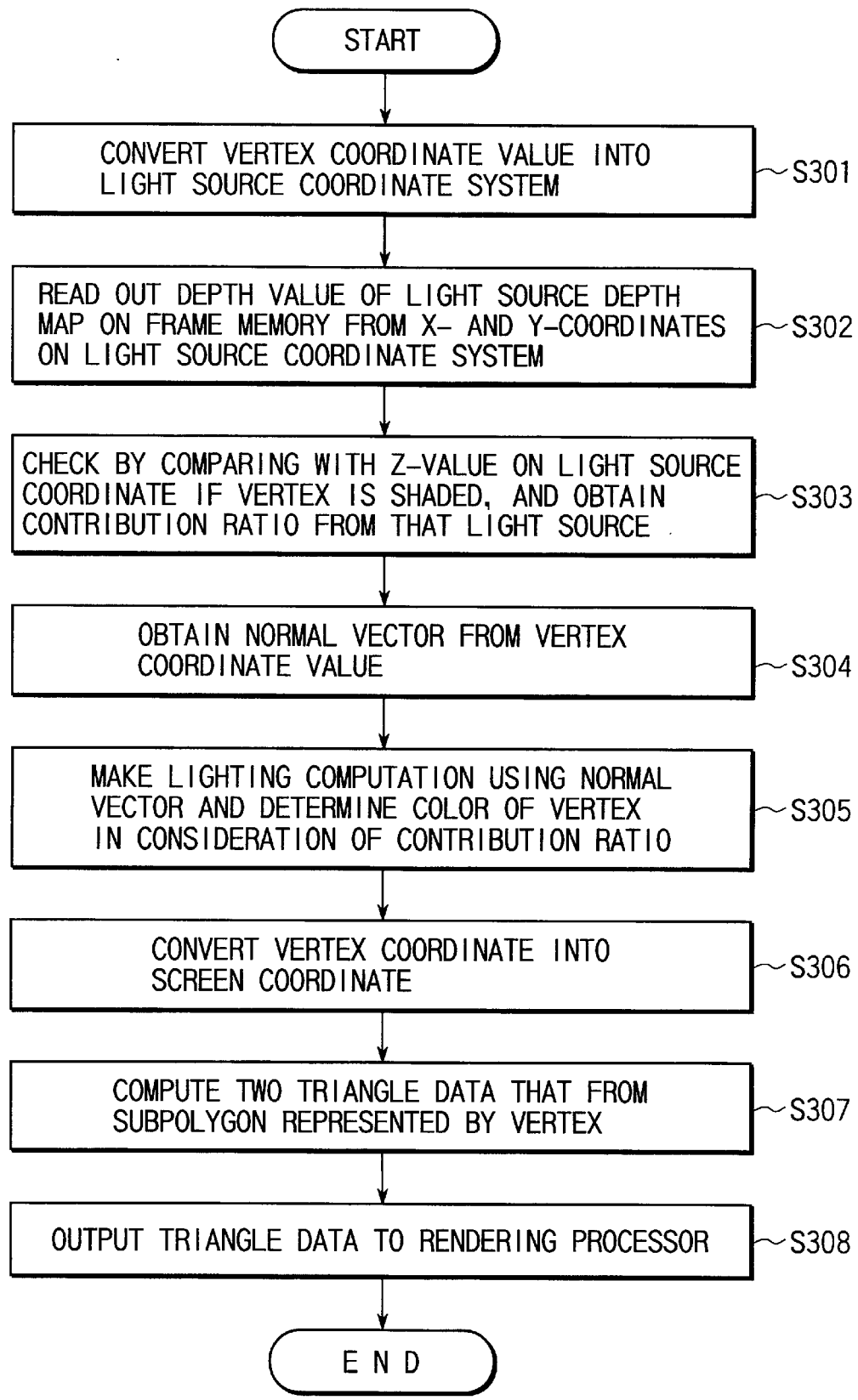
FIG. 10 is a flow chart showing another example of the flow of a process in units of vertexes in the vertex processor.

The process in units of vertexes in the vertex processor 30 upon executing shading using the light source depth map in the frame memory 80 will be explained below using the flow chart shown in FIG. 10.

The coordinate system of the vertex of interest is converted into a light source coordinate system so as to be suitably used in computations on the light source depth map (step S301). A light source depth value on the light source depth buffer 805 in the frame memory 80 is read out based on X- and Y-coordinate values on the converted light source coordinate system by the frame memory access unit 50 via the frame memory readout route 60 and cache 70 (step S302). It is checked by comparing the readout light source depth value with the Z value on the light source coordinate system if the vertex of interest is shaded, and the contribution ratio from that light source is obtained (step S303). A normal vector is obtained from the coordinate values of the vertex (step S304), a lighting computation is made using the normal vector, and the vertex color is determined based on the computation result and the contribution ratio obtained in step S303 (step S305). A method of obtaining a normal vector will be described in detail later using FIG. 16. For drawing, the vertex coordinates are converted into screen coordinates (step S306), and two triangle data that form a subpolygon represented by the vertex of interest are computed by obtaining coefficients of a trigonometric equation (step S307). The triangle data obtained in step S307 are output to the frame memory access unit 50 (step S308), thus ending the processing.

Processing Example 3 of Vertex Processor 30

Figure 11:
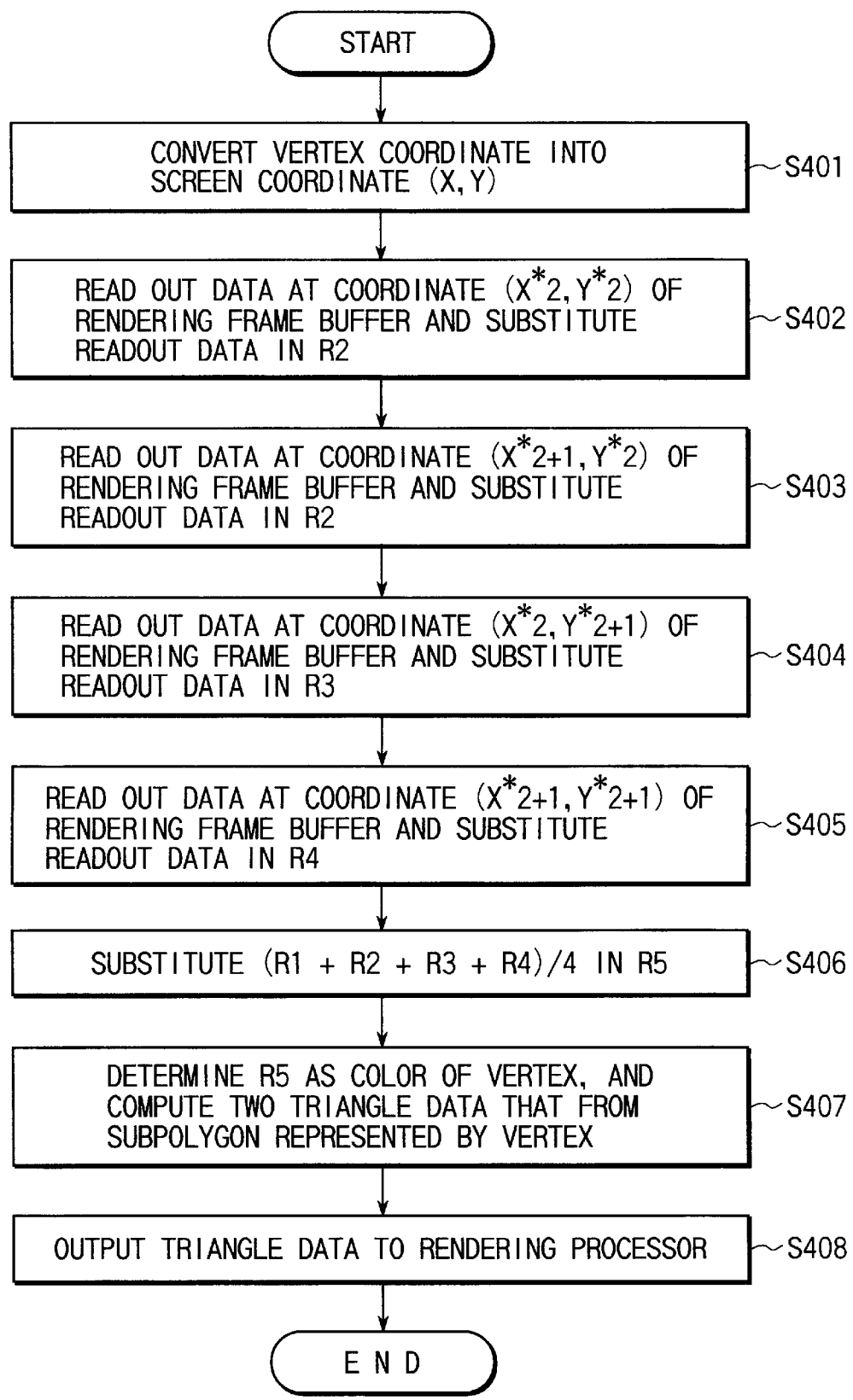
FIG. 11 is a flow chart showing an example of a process in units of vertexes of a 2D picture process in the vertex processor.

An example of the process for generating a picture by halving that on a working storage area (rendering frame buffer 806) in the frame memory 80 in both the vertical and horizontal directions by the vertex processor 30 as an example of a 2D picture process will be explained below using the flow chart shown in FIG. 11.

In order to implement this process, the shape divider 10 must form a subpolygon mesh so that the subpolygon size is equal to a pixel on the screen coordinate system. The vertex processor 30 executes the process according to FIG. 11 for each vertex. The coordinate values of the vertex of interest are converted into screen coordinate values (X, Y) (step S401). The screen coordinate values (X, Y) are used to designate the write pixel position on the picture display frame buffer 801, and to designate the readout position of picture data on the rendering frame buffer 806.

By adding differences to the doubled values of X and Y, data at four points on the rendering frame buffer 806, which serve as sources of data to be written at a pixel position having the coordinate values (X, Y), are read (steps S402 to S405). The average of the data at these four points is computed, and is substituted in a register R5 (step S406). The coefficients of a trigonometric equation for drawing are computed using the value of the register R5 as a vertex color, and two triangle data that form a subpolygon represented by the vertex of interest are computed (step S407). The triangle data obtained in step S407 are output to the rendering processor 40 and the frame memory access unit 50 (step S408), thus ending the processing.

SIMD Architecture

Figure 12:
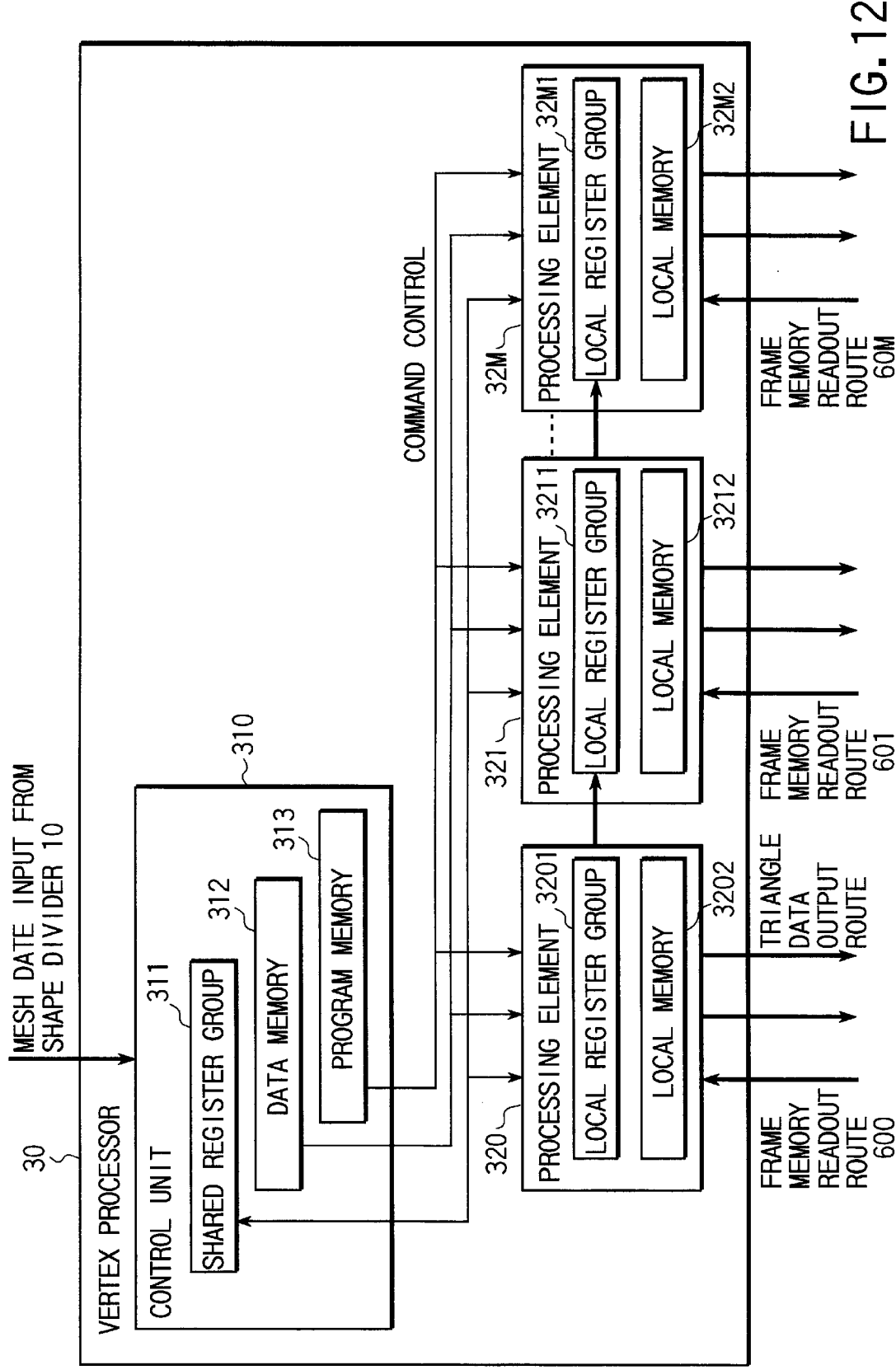
FIG. 12 is a block diagram showing the arrangement of the vertex processor.

The detailed arrangement of the vertex processor 30 will be described below using FIG. 12. The vertex processor 30 has a single control unit 310 and a plurality of processing elements 320, 321, . . . , 32M. Let Cn be the number M+1 of the processing elements 320, 321, . . . , 32M. These processing elements 320, 321, . . . , 32M belong to a so-called SIMD (Single instruction, multiple data stream) architecture in parallel computation architecture classification.

More specifically, the processing elements 320, 321, . . . , 32M simultaneously execute respective commands of a single program shared on a program memory 313 in the control unit 310 in an identical cycle. The SIMD architecture has a limitation that all processing elements must execute an identical command of an identical program, but since the vertexes of a single mesh normally have identical properties, execution of an identical program does not limit this embodiment.

On the other hand, with such SIMD architecture, many units such as a command readout unit and the like, which need not be equipped in the individual processing elements 320, 321, . . . , 32M, need only be equipped in only the control unit 310, thus improving the arrangement efficiency of the apparatus. Also, an advantage of the SIMD architecture is that neighboring vertex data can be synchronously used in a computation of a normal vector and the like. Furthermore, the processing elements 320, 321, . . . , 32M logically linearly line up in this embodiment, and the apparatus arrangement can be simpler than a 2D layout.

The control unit 310 has a shared register group 311, data memory 312, and program memory 313. In this embodiment, the control unit 310 includes the data memory 312 and program memory 313, but the present invention is not limited to such specific arrangement.

The shared register group 311 stores data common to or shared by the processing elements 320, 321, . . . , 32M. The data memory 312 stores data from the shape divider 10. For this reason, upon transfer of data to the vertex processor 30, the shape divider 10 can start a division process of the next primitive. The program memory 313 stores programs for operating the control unit 310 and processing elements 320, 321, . . . , 32M.

The processing elements 320, 321, . . . , 32M respectively have logical register groups 3201, 3211, . . . , 32M1, and local memories 3202, 3212, . . . , 32M2, and make arithmetic operations using these memories and the shared register group 311. In this embodiment, the local memories 3202, 3212, . . . , 32M2 are included in the processing elements 320, 321, . . . , 32M, but may be connected outside these units.

Furthermore, neighboring local register groups 3201, 3211, . . . , 32M1 are connected via data transfer routes. With these data transfer routes, the local register groups 3211, . . . , 32M1 of the local register groups 3201, 3211, . . . , 32M1 can receive data transferred from the local register groups 3210, . . . , 32M−11 in the processing elements 320, 321, . . . , 32M−1 that neighbor one side (left side in FIG. 12) in the linear layout direction of the processing elements 320, 321, . . . , 32M. In this manner, upon executing arithmetic operations in units of vertexes in the processing elements 320, 321, . . . , 32M, the computation results of neighboring vertexes can be used, and a normal vector computation and the like (to be described later) can be easily made.

In the processing elements 320, 321, . . . , 32M, basically, arithmetic operations that pertain to individual vertexes are independently done using data such as the coordinate values of these vertexes. The processing elements 320, 321, . . . , 32M normally execute arithmetic operations for different vertexes, but a plurality of processing elements may execute arithmetic operations for a single vertex by degeneracy of data or the like.

Figure 13:
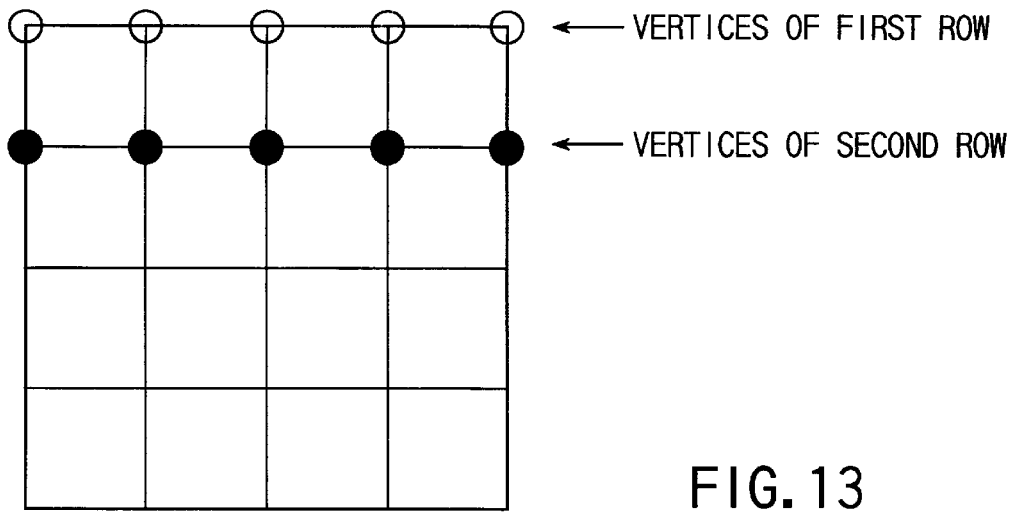
FIG. 13 is a view for explaining "rows" of subpolygon meshes.

The vertex processor 30 simultaneously makes arithmetic operations for the respective rows of a subpolygon mesh using the processing elements 320, 321, . . . , 32M. FIG. 13 shows "rows" of a subpolygon mesh. The processing elements 320, 321, . . . , 32M simultaneously make arithmetic operations for the first row indicated by open circles, then simultaneously make arithmetic operations for the second row indicated by full circles, and also simultaneously make arithmetic operations for the third row, fourth row, . . . , i.e., in units of rows.

Figure 14:
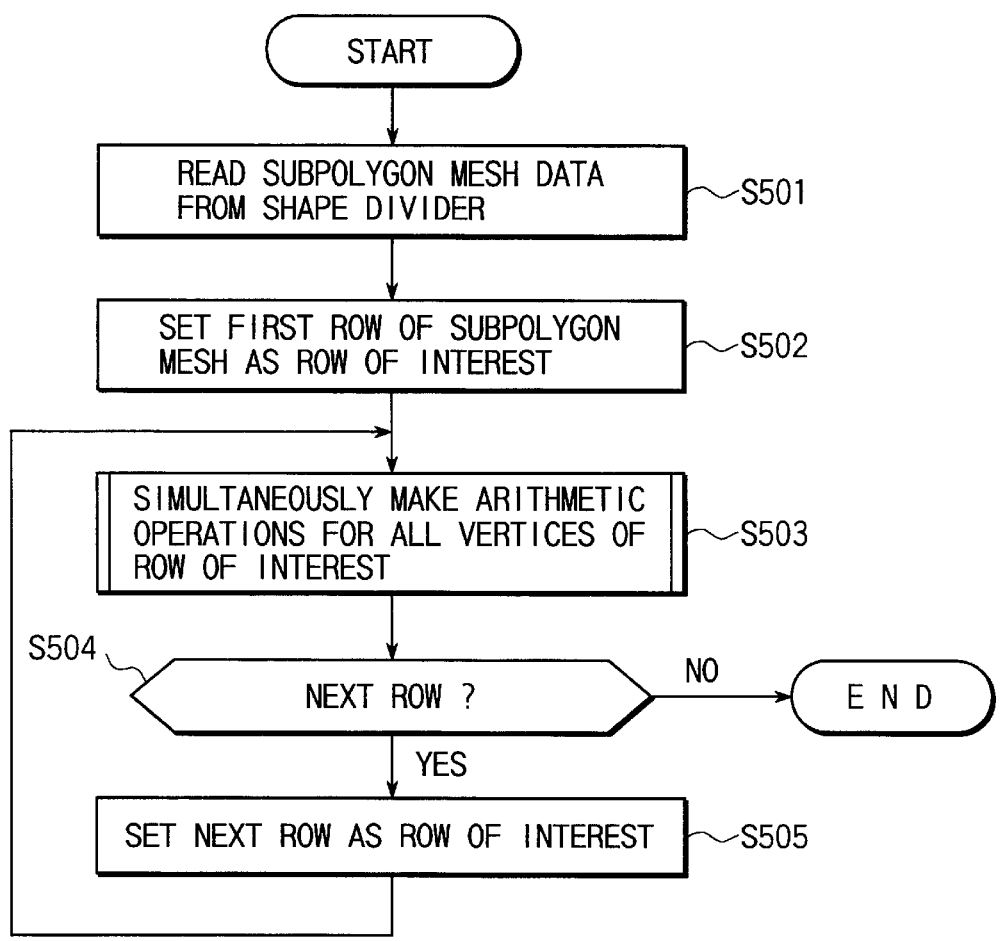
FIG. 14 is a flow chart showing the flow of a process in the vertex processor for one subpolygon mesh.

FIG. 14 shows the flow of the process in the vertex processor 30 for one subpolygon mesh.

Subpolygon mesh data is read from the shape divider 10 (step S501). The first row of this subpolygon mesh is set as the row of interest of the processing elements 320, 321, . . . , 32M (step S502), and the processing elements 320, 321, . . . , 32M execute arithmetic operations for all vertexes of the row of interest (step S503). The arithmetic operation contents are shown in FIGS. 9 and 10 previously.

Upon completion of the arithmetic operation for the row of interest, it is checked if the next row to be processed still remains (step S504). If all the rows have been processed, the processing ends. On the other hand, if the next row to be processed still remains, that row is set as the row of interest (step S505), and the flow returns to step S503 to execute arithmetic operations.

In this fashion, computations are independently done in units of vertexes. However, computations of a normal vector and those of the coefficients of the trigonometric equation require the computation results of neighboring vertexes. The computation methods of a normal vector and the coefficients of the trigonometric equation will be explained below.

Computation of Normal Vector

Since a lighting computation requires a normal vector value, a normal vector computation at each vertex of a subpolygon mesh is often required. For example, such computation is required when a primitive is a curved surface or a vertex undergoes bump mapping or displacement mapping. In general, a normal vector is obtained as an outer product of non-parallel, two tangent vectors of a plane or curved surface.

The computation method of a normal vector assuming that a subpolygon is a plane will be explained below using FIG. 15. Note that PO, PL, PU, and PUL in the following description are 3D coordinate values.

A normal vector NO of a vertex that represents one subpolygon is given by:

$$NO = \text{normalization}((PL-PO) \times (PU-PO))$$

Note that the normalization function normalizes the length of a vector to 1. Also, × means a vector outer product computation. PL−PO is the difference between the coordinate value PO of the vertex of interest, and the coordinate value PL of its "left" neighboring vertex. PU−PO is the difference between the coordinate value PO of the vertex of interest, and the coordinate value PU of its "upper" neighboring vertex.

Figure 16:
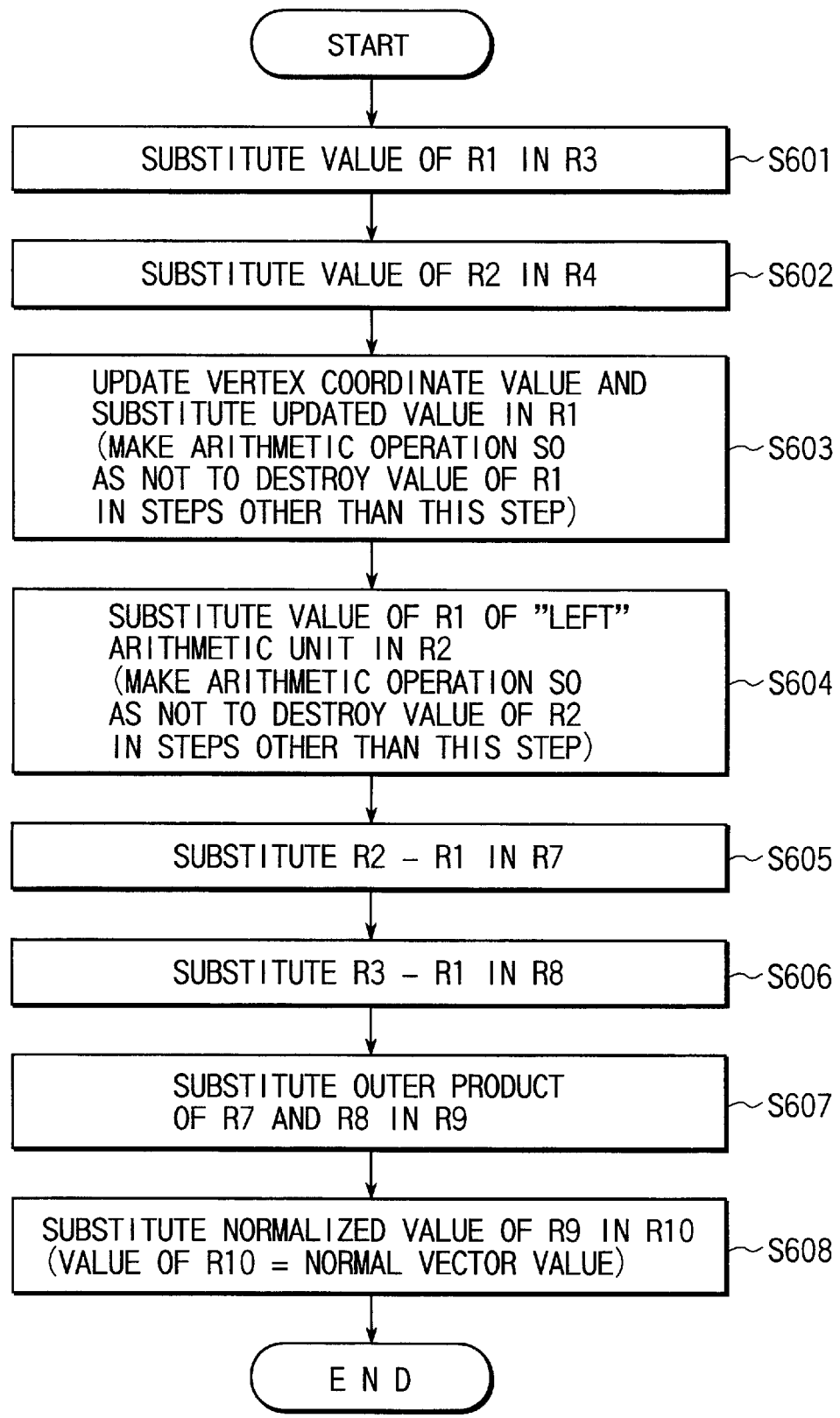
FIG. 16 is a flow chart showing an example of the flow of normal vector computations in units of vertexes in the vertex processor.

The computation sequence of a normal vector in this embodiment will be explained below using the flow chart shown in FIG. 16. In FIG. 16, R1 to R10 are vector type local registers having three- or four-dimensional elements of the processing elements 320, 321, . . . , 32M.

The program shared by the processing elements 320, 321, . . . , 32M is as follows.

Contents of R1 are substituted in R3 (step S601).
Contents of R2 are substituted in R4 (step S602).
The displaced coordinate value of the vertex is computed so as not to destroy data of R3 and R4, and is substituted in R1 (step S603). Note that it is programmed not to write a value in R1 in steps other than this step.

The value of the local register R1 of the "left" neighboring processing element is read out, and is substituted in R2 (step S604). Note that it is programmed not to write a value in R2 in steps other than this step.

In this manner, since the local registers R1, R2, R3, and R4 respectively store the displaced coordinate value PO of the vertex, the displaced coordinate value PL of the "left" vertex, the displaced coordinate value PU of the "upper" vertex", and the displaced coordinate value PUL of the "upper left" vertex, an outer product is computed from these data so as not to destroy the data of R1 and R2, and is normalized. For example, the program is as follows.

R1 is vector-subtracted from R2 and the difference is substituted in R7 (step S605).
R1 is vector-subtracted from R3 and the difference is substituted in R8 (step S606).
An outer product of R7 and R8 is substituted in R9 (step S607).
The length of the vector of R9 is normalized to 1, and that vector is substituted in R10 (step S608).

After that, the vertex processing program is executed to its end so as not to destroy data of R1 and R2.

In this manner, a normal vector is computed for each vertex. The normal vector computation described using FIG. 16 is included in processing example 1 explained using FIG. 9 or processing example 2 explained using FIG. 10. The flow upon executing these processes for each vertex with respect to all vertexes of a subpolygon mesh will be explained below using FIGS. 14 and 16 again.

In FIG. 14, the process in step S503 is repeated in units of rows.

When the flow advances from step S502 to step S503, the processing elements 320, 321, . . . , 32M simultaneously execute a vertex process for the vertexes of the first column of a mesh.

At the beginning of the process in FIG. 16, the values of R1 and R2 are indefinite, and these indefinite values are substituted in R3 and R4 in steps S601 and S602. However, as shown in FIG. 6C, since the vertexes of the first row do not represent subpolygons of the mesh, these values are not used. Then, new R1 and R2 required for the next row are normally obtained. In this stage, the vertex processor 30 does not output any subpolygon.

The flow returns from step S505 to step S503 in FIG. 14. The processing elements 320, 321, . . . , 32M simultaneously execute a vertex process in turn for the vertexes of the second row of the mesh. In this case, the arithmetic operation results R1 and R2 of the first column as the "upper" column are left, and are substituted in R3 and R4, so that R3 and R4 respectively become the coordinate values of the "upper" and "upper left" vertexes. Using these coordinate values, and newly computed R1 and R2, a normal vector is obtained, and color information of the vertex of the subpolygon is computed and output.

Note that the vertex at the left end of each row has an indefinite value of R1 from the "left" vertex. However, since the vertex at the left end of each row does not represent a subpolygon, no problem is posed. Since required arithmetic operation results R1 can be obtained even at these vertexes at the left end, their "right" neighboring vertexes can use the results.

By repeating the above processes for all the columns of a mesh, normal vectors are obtained for the vertexes of all subpolygons of the mesh. A lighting computation can be normally made from these normal vectors.

Trigonometric Equation Coefficient Computation of Subpolygon

Upon processing data of one subpolygon by the rendering processor 40, for example, a method using the conventional rasterization technique is available. In this method, as shown in FIG. 8, two triangles are generated from one subpolygon, and are drawn on the frame memory by triangle rasterization. These triangles may be processed as independent ones, but may be processed as a triangle strip shown in FIG. 8.

Figure 15:
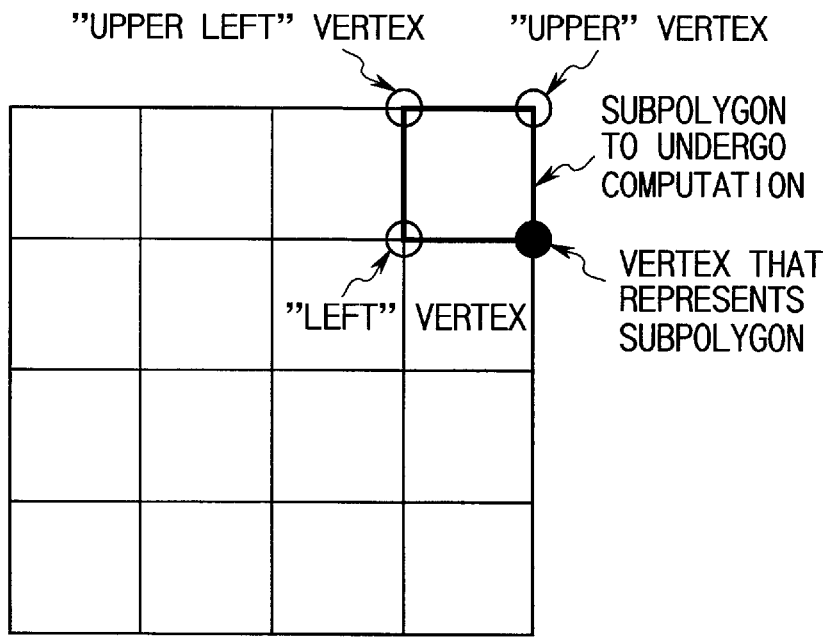
FIG. 15 shows a representative vertex, and "left", "upper", and "upper left" vertexes of one subpolygon.

The two triangles obtained by dividing the subpolygon are a triangle A defined by "left", "upper", and "upper left" vertexes with respect to the representative vertex shown in FIG. 15, and a triangle B defined by the representative vertex and "upper" and "left" vertexes.

Hence, since the vertex information of each of the "left", "upper", and "upper left" vertexes of a given vertex can be used by the same method as in the normal vector computation, coefficients required for the conventional triangle rasterization process, e.g., the inclinations of the respective side of a triangle, and X- and Y-displacements of depth information and color information can be obtained using such information.

Rendering Processor 40 and Frame Memory Access Unit 50

Figure 17:
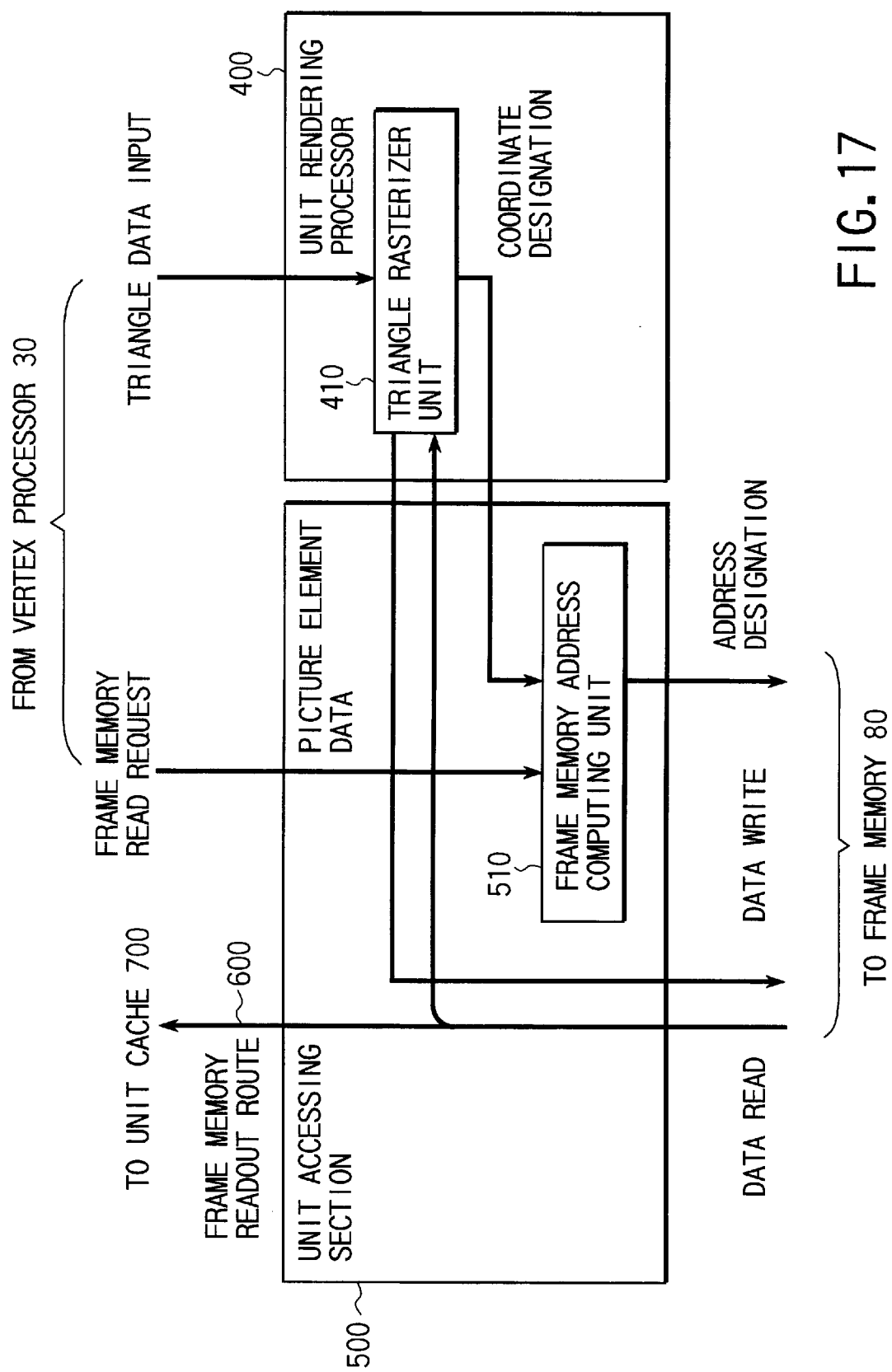
FIG. 17 is a block diagram showing an arrangement unit of a rendering processor and frame memory access unit in the graphic processor.

As shown in FIG. 17, the rendering processor 40 comprises one or a plurality of unit rendering processors 400 and, also, the frame memory access unit 50 comprises one or a plurality of unit accessing sections 500. The unit rendering processor 400 basically has a function of drawing triangles or a triangle strip from the vertex processor 30 in units of pixels. In order to implement this function, for example, the following two methods are available, and the unit rendering processor 400 can execute at least one of these methods:

(1) a process for painting each triangle of triangles or a triangle strip sent from the vertex processor 30 equivalent to the conventional rasterization processor; and (2) a process for efficiently sampling and drawing triangles smaller than a pixel.

On the other hand, the unit accessing section 500 has a function of transferring data on the frame memory 80 to the vertex processor 30 via a frame memory readout route 600 in response to a data readout request from the vertex processor 30.

The unit rendering processor 400 shown in FIG. 17 has a triangle rasterizer unit 410 that implements the process (1). This triangle rasterizer unit 410 executes a repetitive process in units of pixels for painting triangles on the basis of input triangle data, designates the memory address of the frame memory 80 using a frame memory address computation unit 510 which forms the unit accessing section 500, and writes pixel data in the frame memory 80. In this case, smooth shading and texture mapping used in the conventional architecture are used as needed.

In texture mapping in units of pixels, the memory access of each texel is designated using frame memory address computation unit 510 to read texel data of a texture map on the frame memory 80 in the repetitive process.

The unit accessing section 500 will be explained below. In this embodiment, since a triangle setup process is done by the vertex processor 30, the unit accessing section 500 has a relatively simple arrangement, and is implemented by only the frame memory address computation unit 510, as shown in FIG. 17.

That is, in the unit accessing section 500, the position on the frame memory 80 designated by a request from the vertex processor 30 is designated by the memory address using the frame memory address computation unit 510 to read data from the frame memory 80, and the read data is returned to the vertex processor 30.

Connection Pattern Between Vertex Processor 30 and Rendering Processor 40/Frame Memory Access Unit 50

Figure 18:
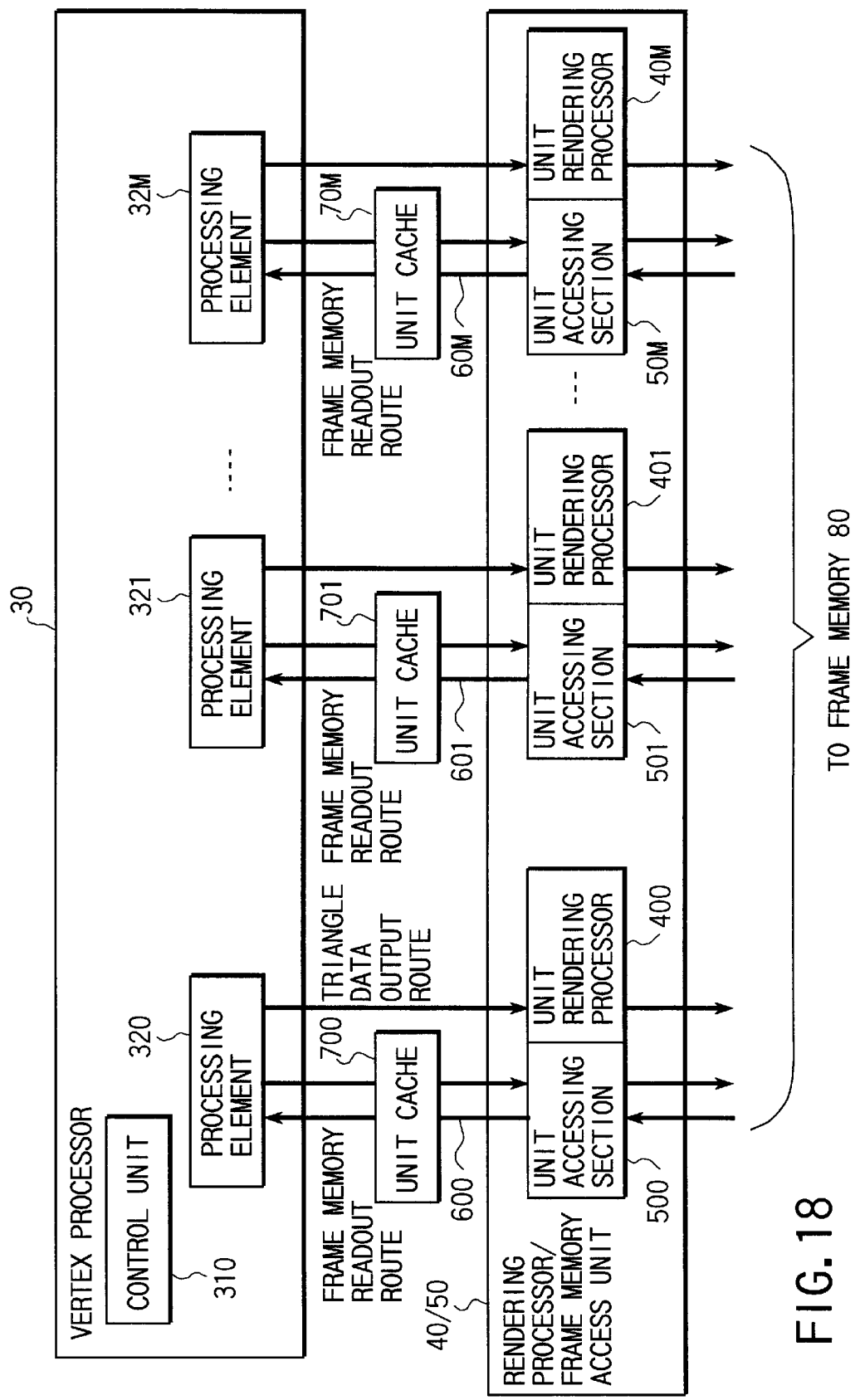
FIG. 18 is a block diagram showing an example of a connection of the vertex processor, rendering processor, and frame memory access unit.
Figure 19:
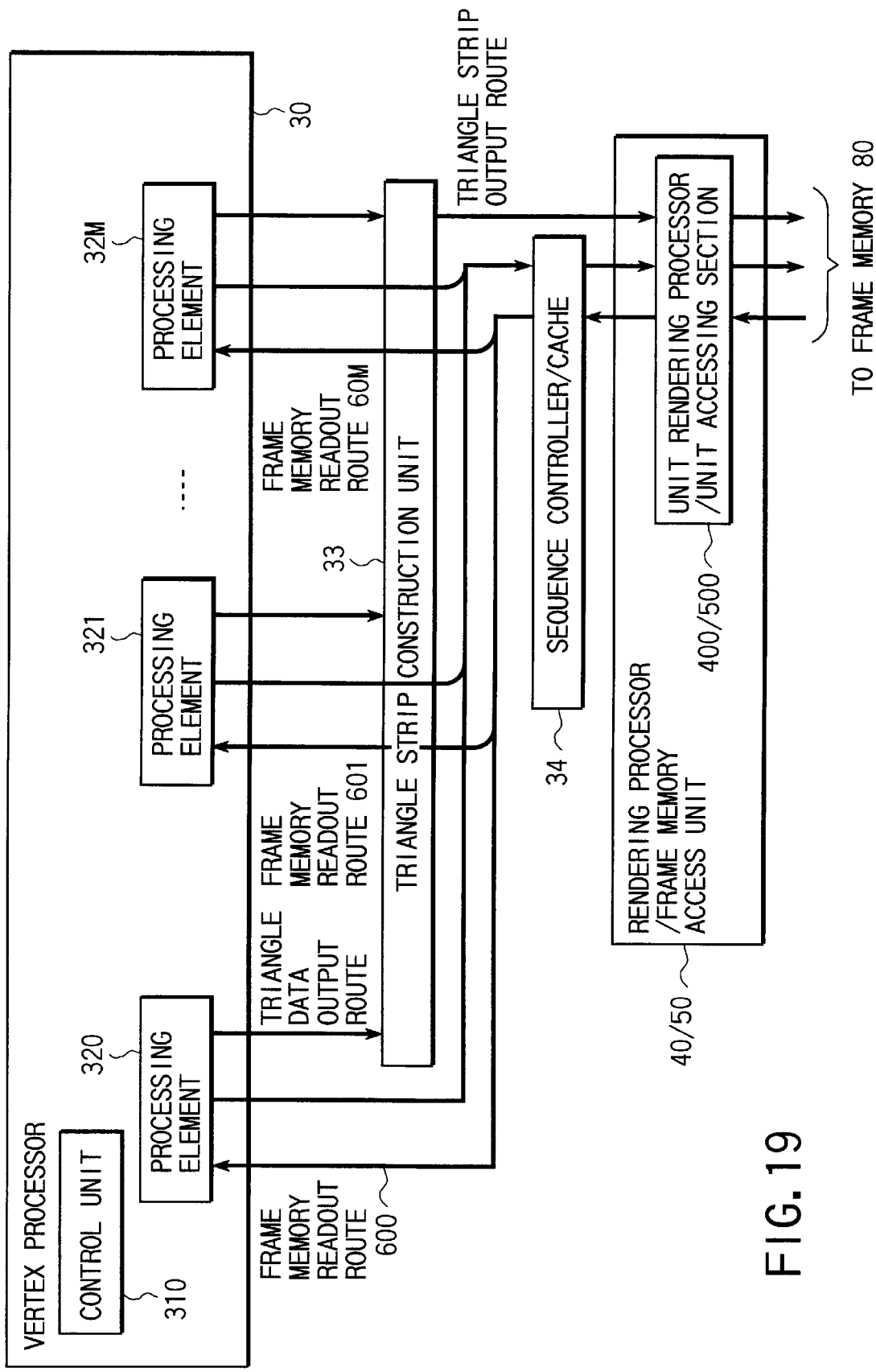
FIG. 19 is a block diagram showing another example of a connection of the vertex processor, rendering processor, and frame memory access unit.

Some connection patterns between the vertex processor 30 and the rendering processor 40/frame memory access unit 50, the unit arrangement of which is shown in FIG. 17, are available. FIGS. 18 and 19 show examples of such connection pattern.

In the pattern shown in FIG. 18, the rendering processor 40 and frame memory access unit 50 respectively have unit rendering processors 400, 401, . . . , 40M, and unit accessing sections 500, 501, . . . , 50M, the numbers of which are equal to the number of processing elements 320, 321, . . . , 32M in the vertex processor 30. The rendering processor 40 and frame memory access unit 50 process in parallel data from the vertex processor 30. Also, data are read out in parallel from the frame memory 80 via frame memory readout routes 600, 601, . . . , 60M and unit caches 700, 701, . . . , +70M, the number of which are equal to the number of processing elements 320, 321, . . . , 32M in the vertex processor 30.

In the pattern shown in FIG. 19, the rendering processor/frame memory access unit 40/50 has one unit rendering processor/unit accessing section 400/500, and time-divisionally processes data from the vertex processor 30 in turn. In this case, triangle data output from the processing elements 320, 321, . . . , 32M make up a triangle strip using a triangle construction unit 33, and the triangle strip is sent to the unit rendering processor 400 in the rendering processor/frame memory access unit 40/50.

A sequence controller/cache 34 sequentially converts data simultaneous readout requests with respect to the frame memory 80 concurrently generated from the processing elements 320, 321, . . . , 32M into readout requests in turn, sends them to the unit accessing section 500 in the rendering processor/frame memory access unit 40/50, stores picture data sequentially read out from the frame memory 80, and simultaneously transfers these data to the processing elements 320, 321, . . . , 32M when all the requested data are ready to transfer. Hence, in this arrangement, access to the frame memory 80 requires a long time, but the arrangement of the rendering processor/frame memory access unit 40/50 can be simplified.

In this embodiment, the number of times of access to the frame memory 80 can be reduced by inserting the cache 70 (unit caches 700, 701, . . . , 70M) in the frame memory readout route 60 (600, 601, . . . , 60M) or in the sequence controller/cache 34, thus improving the picture data read speed.

Note that the cache position is not limited to the frame memory readout route 60 (600, 601, . . . , 60M) or the sequence controller/cache 34, but may be set at other positions such as those in the vertex processor 30, frame memory access unit 50, and the like.

Second Embodiment

Figure 20:
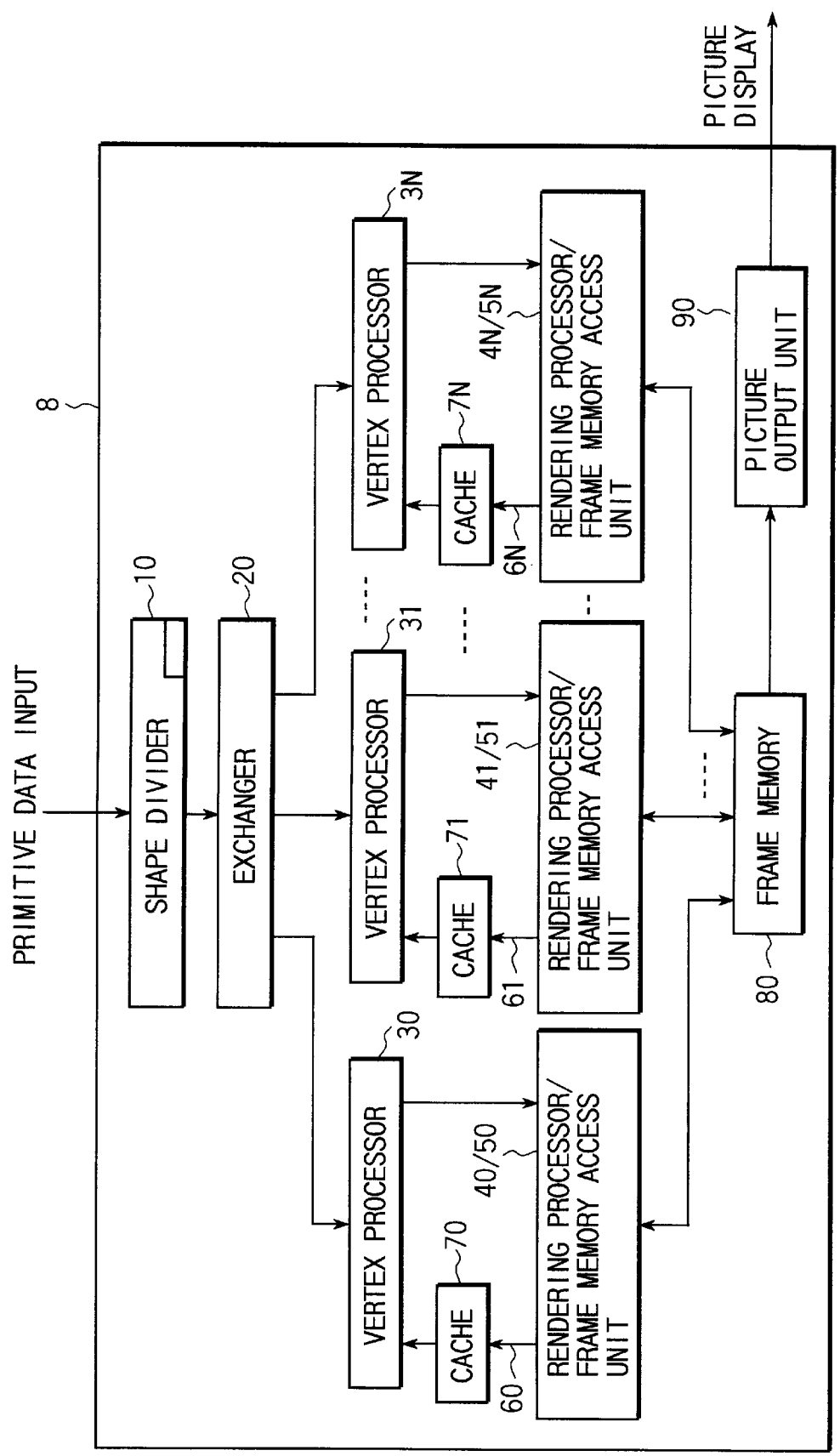
FIG. 20 is a block diagram showing the arrangement of a graphic processor according to the second embodiment of the present invention.

FIG. 20 shows a graphic processor according to the second embodiment of the present invention. Upon giving an explanation using the same reference numerals that denote the same parts as those in FIG. 2, this embodiment is different from the first embodiment in that it has a plurality of (N+1) vertex processors 30, 31, . . . , 3N, and N+1 rendering processors/image memory access units 40/50, 41/51, . . . , 4N/5N, and also comprises an exchanger 20 for arbitrarily exchanging and connecting the output of the shape divider 10 and the inputs of the vertex processors 30, 31, . . . , 3N.

The vertex processors 30, 31, . . . , 3N independently operate, and can execute different programs. Since the vertex processors 30, 31, . . . , 3N have no mutual dependency, a circuit that operates at high speed can be easily designed.

In this embodiment, the plurality of vertex processors 30, 31, . . . , 3N need not always have the same number of processing elements. For example at least one of the vertex processors 30, 31, . . . , 3N may have an arrangement having a plurality of processing elements described in the first embodiment, and at least another vertex processor may have an arrangement having two processing elements dedicated to a line primitive. In such case, the control of the exchanger 20 must be devised.

According to the arrangement with the plurality of vertex processors 30, 31, . . . , 3N as in this embodiment, the efficiency can be improved compared to the arrangement which comprises only one vertex processor simply having many processing elements.

For example, a case will be examined below wherein a plurality of meshes each having a small number of vertexes that define the width are successively sent from the shape divider 10. In such case, in the arrangement using one vertex processor 30 having a large number of processing elements 320, 321, . . . , 32M as in the first embodiment, only processing elements corresponding to the number of vertexes that define the width for each mesh make significant arithmetic operations, and the process for the next mesh cannot start until the process for this mesh is completed.

By contrast, in this embodiment, even when one of the vertex processors 30, 31, . . . , 3N processes one mesh, other vertex processors can process the next mesh, thus allowing parallel arithmetic operations of a plurality of meshes.

The exchanger 20 newly added in this embodiment will be explained below.

Figure 21:
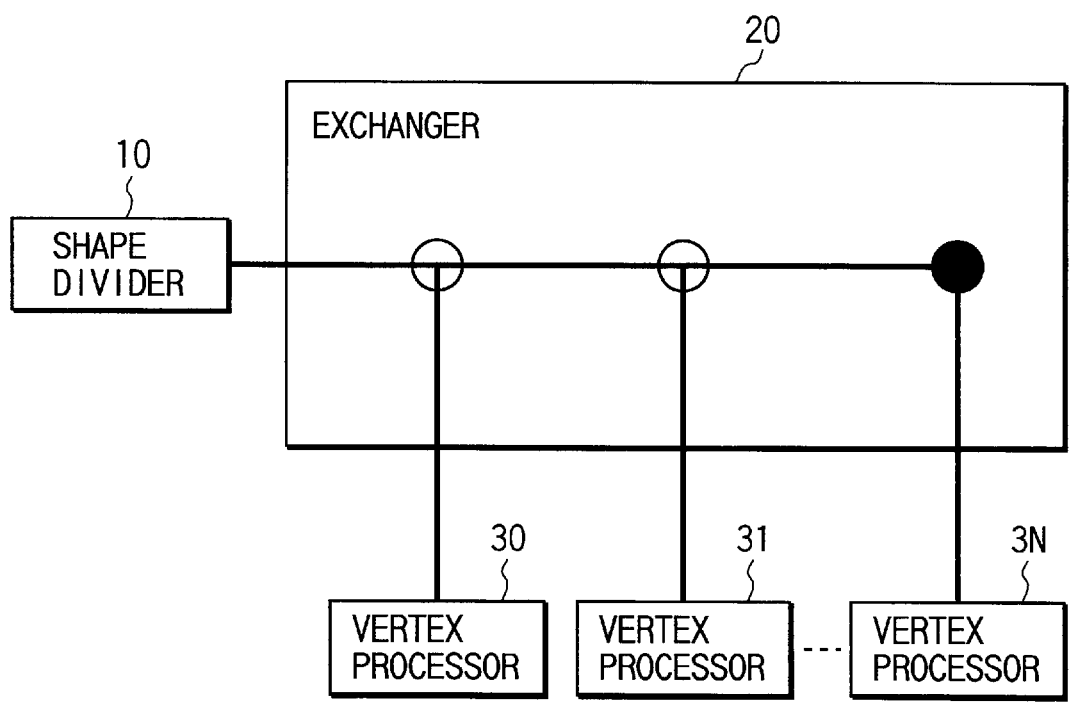
FIG. 21 is a block diagram showing the arrangement of an exchanger in the graphic processor of the second embodiment.

As shown in the schematic arrangement in FIG. 21, the exchanger 20 switches connections between the output of the shape divider 10 and the inputs of the vertex processors 30, 31, . . . , 3N in accordance with a request from the shape divider 10 and the operation states of the vertex processors 30, 31, . . . , 3N. In FIG. 21, switches are inserted in nodes (indicated by open circles and a full circle) of intersections between the output line from the shape divider 10 and the input lines of the vertex processors 30, 31, . . . , 3N, and the switch of the node indicated by the full circle is ON. In this manner, a data transfer route is formed between the output of the shape divider 10 and the input of the vertex processor 3N via the node indicated by the full circle.

Figure 22:
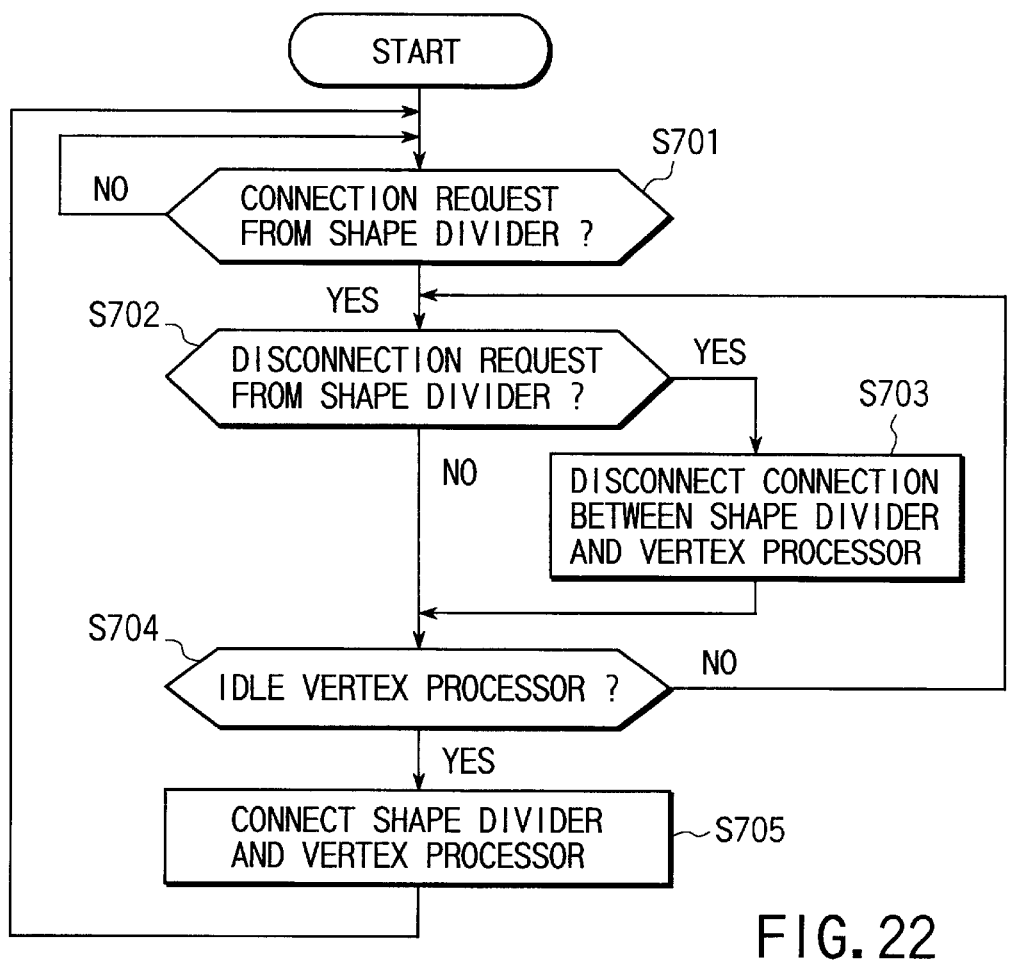
FIG. 22 is a flow chart showing the flow of a process of the exchanger shown in FIG. 21.

The flow of the process of the exchanger 20 will be explained below using the flow chart shown in FIG. 22.

The exchanger 20 stands by until the shape divider 10 generates a connection request to the vertex processors 30 to 3N (step S701). Upon receiving a disconnection request from the shape divider 10 (step S702), connection is disconnected (step S703). The exchanger 20 searches the vertex processors 30, 31, . . . , 3N for an idle one (the process of which is not underway), and if no idle vertex processor is found, the flow returns to step S702 (step S704). If an idle vertex processor is found from the vertex processors 30, 31, . . . , 3N, the exchanger 20 turns on the switch of the node between the output of the shape divider 10 and the idle vertex processor, thus connecting them (step S705).

Third Embodiment

Figure 23:
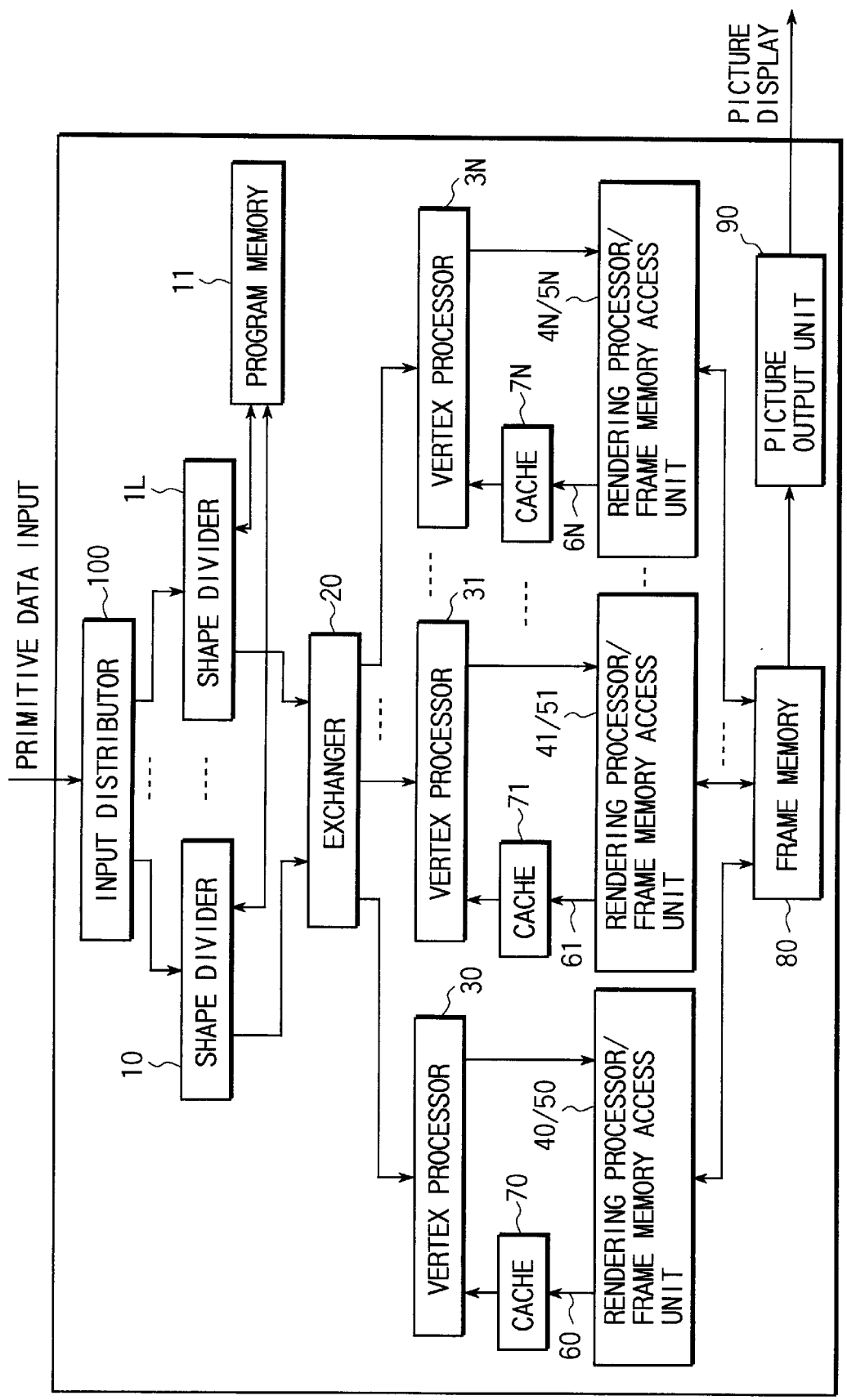
FIG. 23 is a block diagram showing the arrangement of a graphic processor according to the third embodiment of the present invention.

FIG. 23 shows a graphic processor according to the third embodiment of the present invention. Upon giving an explanation using the same reference numerals that denote the same parts as those in FIG. 20, this embodiment has a plurality of (L+1) shape dividers 10, . . . , 1L, an input distributor 100 for distributing inputs to these shape dividers 10, . . . , 1L, and a program memory 11.

The input distributor 100 searches the plurality of shape dividers 10, . . . , 1L for an idle one, and sends data and a program, which are input to the graphic processor and stored in the program memory 11, to that shape divider.

Figure 24:
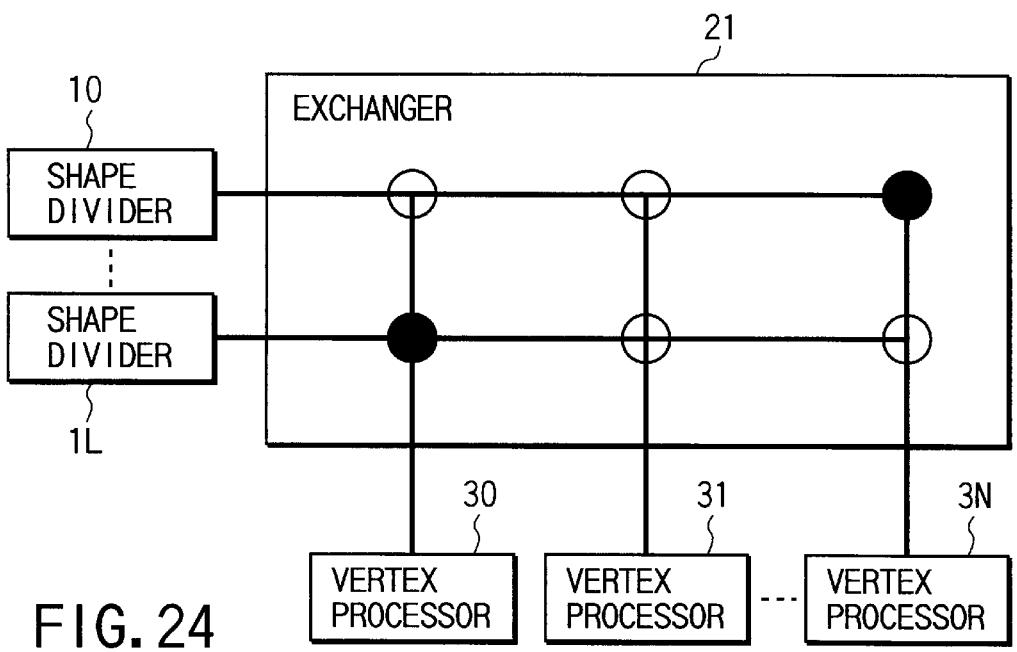
FIG. 24 is a block diagram showing the arrangement of an exchanger in the graphic processor of the third embodiment.

An exchanger 21 has a function of controlling connection requests from the plurality of shape dividers 10, . . . , 1L in addition to that of the exchanger 20 in the second embodiment, and forms a data transfer route between the output of one shape divider and the input of one vertex processor. As shown in FIG. 24, switches are inserted at nodes (indicated by open circles and full circles) of the intersections of the output lines from the shape dividers 10, . . . , 1L and the input lines of the vertex processors 30, 31, . . . , 3N, and switches indicated by full circles are ON. In the example shown in FIG. 24, data transfer routes are formed between the output of the shape divider 10 and the input of the vertex processor 3N, and between the output of the shape divider 1L and the input of the vertex processor 30 via the nodes indicated by full circles.

If Sn shape dividers 10, . . . , 1L are connected, a maximum of Sn data transfer routes can be simultaneously formed, and the shape dividers 10, . . . , 1L can efficiently operate. In the flow of the process of the exchanger 21, the contents of steps S701 and S702 of the flow chart shown in FIG. 22 mentioned above can be modified to check the presence/absence of connection and disconnection requests from the plurality of shape dividers 10, . . . , 1L.

In this embodiment, the plurality of shape dividers 10, . . . , 1L independently operate by executing independent programs, and divide input primitives in accordance with identical or different programs. In one example of the arrangement of the shape dividers 10, . . . , 1L, the shape dividers 10, . . . , 1L respectively have independent instruction memories. In another example of the arrangement of the shape dividers 10, . . . , 1L, a large-size shared program memory is provided, and the shape dividers 10, . . . , 1L respectively have instruction caches, thus efficiently using the program memory.

In the second embodiment, since only one shape divider 10 is connected, the process for the next primitive cannot start until the process for one primitive is completed. Hence, all the plurality of vertex processors 30, 31, . . . , 3N do not always operate in some cases. By contrast, in the third embodiment, since the plurality of shape dividers 10, . . . , 1L operate in parallel, the mesh data size that can be sent to the vertex processors 30, 31, . . . , 3N per unit time can be increased, thus improving the processing performance.

When a given shape divider processes a primitive which requires a long time in division arithmetic operations, another shape divider divides a succeeding primitive which does not require a long time in division arithmetic operations and sends data to the vertex processor before that given shape divider, thus further improving the efficiency.

As described above, according to a graphic computing apparatus of the present invention, since the division size upon generating subpolygon meshes by dividing a primitive into a plurality of subpolygons can be arbitrarily varied, an application creator can easily control the drawing speed and image quality.

Since an elaborate drawing scheme using texture data stored in the frame memory and the like can be used in units of vertexes, processes in units of vertexes can be done more efficiently.

Since vertex processes for a plurality of polygon meshes are simultaneously done using a plurality of vertex processors, the vertex process efficiency can be improved, and a picture with higher quality can be generated if the generation time remains the same.

Furthermore, since division processes for a plurality of primitives are simultaneously done using a plurality of shape dividers, the primitive process efficiency can be improved, and a picture with higher quality can be generated if the generation time remains the same.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A graphic computing apparatus comprising:
    a shape divider which divide a unit shape of a surface of an object present in a three-dimensional space into a plurality of subpolygons two-dimensionally arranged in terms of their neighboring relationship and having an arbitrary size, to generate a subpolygon mesh;
    a vertex processor which performs at least one of arithmetic operations of vertex displacement, coordinate conversion, coloring, and shading using various programs in units of vertexes of subpolygons of the subpolygon mesh to obtain parameters required for drawing;
    a rendering processor which computes drawing data in units of pixels on the basis of the parameters obtained by the vertex processor and picture data for texture mapping; and
    a frame memory which stores the drawing data as picture data together with at least data for texture mapping required for the rendering processor to compute the drawing data; and
    a frame memory readout route which reads out at least the picture data for texture mapping from the frame memory, and transfers the readout picture data to the vertex processor,
    the vertex processor reading at least the picture data for texture mapping corresponding to each vertex of the subpolygon mesh from the frame memory via the frame memory readout route, and computing the parameters required for drawing in units of pixels of the subpolygons for each vertex of the subpolygon meshes using the read data.

2. An apparatus according to claim 1, further comprising a cache which temporarily stores the data read via the frame memory readout route.

3. An apparatus according to claim 1, wherein the vertex processor has a plurality of processing elements which respectively perform arithmetic operations for computing the parameters, and simultaneously makes the arithmetic operations for a plurality of vertexes in accordance with an identical program.

4. An apparatus according to claim 3, wherein the plurality of processing elements repeat the process for simultaneously making the arithmetic operations for each row of the subpolygon mesh in correspondence with the number of rows of the subpolygon mesh.

5. An apparatus according to claim 3, wherein the plurality of processing elements are linearly arranged and have data transfer routes for connecting the processing elements neighboring in an arrangement direction, and all the processing elements simultaneously transfer at least some of internal data to the processing elements neighboring in the arrangement direction via the data transfer routes.

6. An apparatus according to claim 5, further comprising a triangle construction unit which constructs the arithmetic operation results of the plurality of processing elements into a consecutive triangle strip, and transfers the triangle strip to the rendering processor.

7. An apparatus according to claim 1, wherein the rendering processor computes the drawing data using mapping in units of vertexes and mapping in units of pixels together.

8. A graphic computing apparatus comprising:
    a shape divider which divides a unit shape of a surface of an object present in a three-dimensional space into a plurality of subpolygons which are two-dimensionally arranged in terms of their neighboring relationship and have an arbitrary size, to generate a subpolygon mesh;
    a plurality of vertex processors which perform at least one of arithmetic operations of vertex displacement, coordinate conversion, coloring, and shading using various programs in units of vertexes of subpolygons of the subpolygon mesh to obtain parameters required for drawing;
    an exchanger which arbitrarily exchanges between an output of the shape divider and inputs of the plurality of vertex processors;
    a rendering processor which computes drawing data in units of pixels on the basis of the parameters computed by the vertex processors and picture data for texture mapping; and
    a frame memory which stores the drawing data as picture data together with at least data for texture mapping required for the rendering processor to compute the drawing data; and
    a frame memory readout route configured to read out at least the picture data for texture mapping from the frame memory, and transfer the readout picture data to the vertex processors,
    the vertex processors reading at least the picture data for texture mapping corresponding to each vertex of the subpolygon mesh from the frame memory via the frame memory readout route, and computing the parameters required for drawing in units of pixels of the subpolygons for each vertex of the subpolygon meshes using the read data.

9. An apparatus according to claim 8, further comprising a cache configured to temporarily store the data read via the frame memory readout route.

10. An apparatus according to claim 8, wherein the vertex processors include a plurality of processing elements which respectively perform arithmetic operations for computing the parameters required for drawing in units of pixels of the subpolygons for each vertex of the subpolygon mesh, and simultaneously make the arithmetic operations for a plurality of vertexes in accordance with an identical program.

11. An apparatus according to claim 10, wherein the plurality of processing elements repeat the process for simultaneously making the arithmetic operations for each row of the subpolygon mesh in correspondence with the number of rows of the subpolygon mesh.

12. An apparatus according to claim 10, wherein the plurality of processing elements are linearly arranged and have data transfer routes for connecting the processing elements neighboring in an arrangement direction, and all the processing elements simultaneously transfer at least some of internal data to the processing elements neighboring in the arrangement direction via the data transfer routes.

13. An apparatus according to claim 10, further comprising a triangle construction unit which constructs the arithmetic operation results of the plurality of processing elements into a consecutive triangle strip, and transfers the triangle strip to the rendering processor.

14. An apparatus according to claim 8, wherein the rendering processor computes the drawing data using mapping in units of vertexes and mapping in units of pixels together.

15. A graphic computing apparatus comprising:
a plurality of shape dividers each of which divides a unit shape of a surface of an object present in a three-dimensional space into a plurality of subpolygons which are two-dimensionally arranged in terms of their neighboring relationship and have an arbitrary size, to generate a subpolygon mesh;
an input distributor which distributes data of the unit shape to the plurality of shape dividers;
a plurality of vertex processors each of which performs at least one of arithmetic operations of vertex displacement, coordinate conversion, coloring, and shading using various programs in units of vertexes of subpolygons of the subpolygon mesh to obtain parameters required for drawing;
an exchanger which arbitrarily exchanges and connects outputs of the plurality of shape dividers and inputs of the plurality of vertex processors;
a rendering processor which computes drawing data in units of pixels on the basis of the parameters computed by the vertex processors and picture data for texture mapping; and
a frame memory which stores the drawing data as picture data together with at least data for texture mapping required for the rendering processor to compute the drawing data; and
a frame memory readout route configured to read out at least the picture data for texture mapping from the frame memory, and transfer the readout picture data to the vertex processors,
the vertex processors reading at least the picture data for texture mapping corresponding to each vertex of the subpolygon mesh from the frame memory via the frame memory readout route, and computes the parameters required for drawing in units of pixels of the subpolygons for each vertex of the subpolygon meshes using the read data.

16. An apparatus according to claim 15, further comprising a cache configured to temporarily store the data read via the frame memory readout route.

17. An apparatus according to claim 15, wherein the vertex processors include a plurality of processing elements which respectively perform arithmetic operations for computing the parameters required for drawing in units of pixels of the subpolygons for each vertex of the subpolygon mesh, and simultaneously makes the arithmetic operations for a plurality of vertexes in accordance with an identical program.

18. An apparatus according to claim 17, wherein the plurality of processing elements repeat the process for simultaneously making the arithmetic operations for each row of the subpolygon mesh in correspondence with the number of rows of the subpolygon mesh.

19. An apparatus according to claim 17, wherein the plurality of processing elements are linearly arranged and have data transfer routes for connecting the processing elements neighboring in an arrangement direction, and all the processing elements simultaneously transfer at least some of internal data to the processing elements neighboring in the arrangement direction via the data transfer routes.

20. An apparatus according to claim 15, further comprising a triangle construction unit which constructs the arithmetic operation results of the plurality of processing elements into a consecutive triangle strip, and transfers the triangle strip to the rendering processor.

21. An apparatus according to claim 15, wherein the plurality of shape dividers share a program memory which stores a processing program.

22. An apparatus according to claim 15, wherein the rendering processor computes the drawing data using mapping in units of vertexes and mapping in units of pixels together.

23. A graphic computing apparatus comprising:
a vertex processor which performs at least one of arithmetic operations of vertex displacement, coordinate conversion, coloring, and shading using various programs in units of a vertex to obtain parameters required for drawing, the vertex representing a vertex of a polygon obtained from a unit shape of a surface of an object present in a three-dimensional space;
a rendering processor which computes drawing data in units of pixels on the basis of the parameters from the vertex processor and picture data for texture mapping; and
a frame memory which stores the drawing data as picture data together with at least data for texture mapping required for the rendering processor to compute the drawing data; and
a frame memory readout route which reads out at least the picture data for texture mapping from the frame memory, and transfer the readout picture data to the vertex processor,
the vertex processor reading at least the picture data for texture mapping corresponding to the vertex from the frame memory via the frame memory readout route, and computing the parameters required for drawing in units of pixels of the polygon for the vertex of the polygon using the read data.

24. A graphic computing apparatus comprising:
a vertex processor which performs at least one of arithmetic operations of vertex displacement, coordinate conversion, coloring, and shading using various programs in units of vertexes of subpolygons of a subpolygon mesh to obtain parameters required for drawing, the subpolygon mesh being generated by dividing a unit shape of a surface of an object present in a three-dimensional space;
a rendering processor which computes drawing data in units of pixels on the basis of the parameters from the vertex processor and picture data for texture mapping; and a frame memory which stores the drawing data as picture data together with at least data for texture mapping required for the rendering processor to compute the drawing data; and a frame memory readout route which reads out at least the picture data for texture mapping from the frame memory, and transfer the readout picture data to the vertex processor, the vertex processor reading at least the picture data for texture mapping corresponding to each vertex of the subpolygon mesh from the frame memory via the frame memory readout route, and computing the parameters required for drawing in units of pixels of the subpolygons for each vertex of the subpolygon meshes using the read data.

25. A graphic computing method comprising:

dividing a unit shape of a surface of an object present in a three-dimensional space into a plurality of subpolygons two-dimensionally arranged in terms of their neighboring relationship and having an arbitrary size, to generate a subpolygon mesh;

executing a vertex process for performing at least one of arithmetic operations of vertex displacement, coordinate conversion, coloring, and shading using various programs in units of vertexes of subpolygons of the subpolygon mesh to obtain parameters required for drawing;

performing a rendering for computing drawing data in units of pixels on the basis of the parameters obtained by the vertex process and picture data for texture mapping; and storing, in a frame memory, the drawing data as picture data together with at least data for texture mapping required for the rendering to compute the drawing data; and reading out at least the picture data for texture mapping from the frame memory, and transferring the readout picture data to the vertex process via a frame memory readout route, the vertex process reading at least the picture data for texture mapping corresponding to each vertex of the subpolygon mesh from the frame memory via the frame memory readout route, and computing the paramaeters required for drawing in units of pixels of the subpolygons for each vertex of subpolygon meshes using the read data.

* * * * *